US008520516B2

United States Patent
Ohnishi et al.

(10) Patent No.: US 8,520,516 B2
(45) Date of Patent: Aug. 27, 2013

(54) COMMUNICATION DEVICE AND COMMUNICATION METHOD

(75) Inventors: Toshiaki Ohnishi, Osaka (JP); Kazuhiro Ando, Kanagawa (JP); Hironori Nakae, Osaka (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 13/030,303

(22) Filed: Feb. 18, 2011

(65) Prior Publication Data

US 2011/0205920 A1    Aug. 25, 2011

(30) Foreign Application Priority Data

Feb. 25, 2010    (JP) ................................. 2010-039701

(51) Int. Cl.
*G01R 31/08*    (2006.01)

(52) U.S. Cl.
USPC ..................... 370/230.1; 370/229; 370/235

(58) Field of Classification Search
USPC ............................................... 370/229–235
See application file for complete search history.

(56) References Cited

U.S. PATENT DOCUMENTS

| 6,701,372 | B2 * | 3/2004 | Yano et al. ................. 709/232 |
| 7,554,945 | B2 * | 6/2009 | Lee et al. ................... 370/329 |
| 7,680,064 | B2 * | 3/2010 | Nabetani et al. ............ 370/252 |
| 7,784,076 | B2 * | 8/2010 | Demircin et al. ............ 725/81 |
| 7,852,814 | B2 * | 12/2010 | Imamura et al. ............ 370/335 |
| 8,037,374 | B2 * | 10/2011 | Iizuka et al. ................ 714/704 |
| 8,068,427 | B2 * | 11/2011 | Gholmieh et al. .......... 370/236 |
| 8,090,323 | B2 * | 1/2012 | Craig et al. ............... 455/67.13 |
| 8,169,904 | B1 * | 5/2012 | Breau et al. ................. 370/231 |
| 8,189,659 | B2 * | 5/2012 | Han et al. ................ 375/240.02 |
| 8,233,427 | B2 * | 7/2012 | Reial et al. ................. 370/318 |
| 2004/0142698 | A1 | 7/2004 | Pietraski |
| 2007/0291829 | A1 | 12/2007 | Nabetani et al. |
| 2010/0128762 | A1 | 5/2010 | Nabetani et al. |

FOREIGN PATENT DOCUMENTS

| JP | 2007-335994 | 12/2007 |
| JP | 2009-124738 | 6/2009 |

* cited by examiner

*Primary Examiner* — Phuc Tran
(74) *Attorney, Agent, or Firm* — Wenderoth, Lind & Ponack, L.L.P.

(57) ABSTRACT

A communication device according to the present invention includes: a receiving unit which receives a block transmitted by a communication device; a photocurrent measuring unit which measures a reception quality of the received block; a PHY rate determining unit which determines, based on the reception quality, a PHY rate that is used by the communication device for transmitting a next block; a block size control unit which determines, based on the measured reception quality, a block size; and a transmission unit which transmits feedback information including the determined PHY rate and the determined block size to the communication device, and the block size control unit determines the block size to be a value smaller than a maximum value of a block size that can be transmitted by the communication device, when a value indicating the reception quality of the block is within a predetermined range including a PHY rate threshold.

10 Claims, 16 Drawing Sheets

COMMUNICATION DEVICE AND COMMUNICATION METHOD

BACKGROUND OF THE INVENTION (1) Field of the Invention

The present invention relates to a communication device and a communication method which adaptively control PHY rate, and particularly relates to a communication device and a communication method using a communication scheme in which communication quality is likely to change at random.

(2) Description of the Related Art

Infrared communication is an example of communication method that allows high-speed data communication. Among communication devices that use infrared communication, in order to increase the intensity of optical signal received by a light-receiving unit of a communication device on a reception side (hereafter referred to as a receiving device), a narrow directivity angle of outgoing light from the light-emitting unit of a communication device on a transmission side (hereafter referred to as transmission device) is usually set. In addition, when at least one of the transmission device and the receiving device is a mobile terminal which performs data communication while being held by a user, the distance between the optical axis of the outgoing light from the transmission device and the light-receiving unit of the receiving device (hereafter referred to as a displacement of optical axis) fluctuates over time due to movements of the hand of the user, for example. In general, as the displacement of optical axis increases, the amount of received light decreases and the communication quality decreases. Particularly, in the high-speed data communication in which a narrow directivity angle of the outgoing light is set. As a result, even when the displacement of optical axis is small, the amount of received light in the light-receiving unit decreases due to a narrow range of radiation of the outgoing light, compared to the low-speed data communication in which a wide directivity angle of the outgoing light is set. In other words, the communication quality significantly changes as the displacement of optical axis changes.

Adaptive control of transmission parameters is one method of stabilizing the transmission rate in such a communication environment in which the communication quality significantly changes over time. Here, the adaptive control of transmission parameters refers to a control method which adaptively controls transmission parameters such as the physical layer (PHY) rate which includes multi-value modulation, coding ratio, and bandwidth, and transmission parameters such as frame size, based on the information indicating reception quality, such as information on the level of received signals. The adaptive control is also a control method for selecting a suitable transmission parameter in accordance with the varying communication quality over time. For this reason, communication using an adaptively controlled transmission parameter has been used in various communication systems, since the communication using the adaptively controlled transmission parameter increases the throughput compared to a case where the communication is performed using a fixed transmission parameter.

In order to perform the adaptive control, the receiving device measures reception quality information (hereafter also referred to as reception quality) indicating quality of reception such as a level of received signals. The receiving device notifies the transmission device of measured reception quality information, information indicating the transmission parameter determined based on the measured reception quality information and others as feedback information. The transmission device determines the transmission parameter based on the feedback information notified by the receiving device, and transmits subsequent data frames (data communication) using the determined transmission parameter.

Another characteristic of infrared communication is that it takes longer to switch the mode of communication device from a transmission mode for transmitting signals to a reception mode for receiving the signals than wireless communication and other communication methods. Thus, in order to suppress degradation in transmission efficiency caused by switching between the transmission mode and the reception mode, burst transmission for infrared communication has been considered. In burst transmission, data frames burst at one transmission. The burst transmission referred here is a transmission method in which the transmission device transmits data frames without receiving a response data frame from the reception device in between the transmission, for example. This is performed by the transmission device continuously transmitting data frames at a predetermined interval, or transmitting concatenated frames which includes concatenated data frames.

In other words, conventionally, each time one data frame is transmitted, the mode of the transmission device is switched from the transmission mode to the reception mode, and the transmission device receives the response data frame such as acknowledgement (ACK) and negative acknowledgment (NACK).

In contrast, in burst transmission, each time the data frames are transmitted by burst transmission, the transmission device is switched from the transmission mode to the reception mode, and the response data frame such as ACK and NACK are received from the receiving device.

Thus, in burst transmission, the number of switching from the transmission mode to the reception mode can be reduced, thereby improving the transmission efficiency. Note that, the burst transmission is also referred to as burst transfer.

However, a combination of the adaptive control and the burst transmission in use causes the following problems.

The problems that arise when the adaptive control and the burst transmission are used in combination shall be described with reference to FIG. 15A and FIG. 15B. FIG. 15A is a sequence diagram illustrating the operations for adaptive PHY rate control when the burst transmission is not performed. FIG. 15B is a sequence diagram illustrating the operations for adaptive PHY rate control when the burst transmission is performed.

A case where the burst transmission is not performed is described with reference to FIG. 15A.

First, the transmission device transmits the data frame #1 to the receiving device (S1501).

Next, the receiving device receives the data frame #1, and measures the received signal level while the data frame #1 is being received. Subsequently, the receiving device generates feedback information based on the measured received signal level. Subsequently, the receiving device notifies the transmission device of the generated feedback information together with a response data frame indicating ACK (hereafter referred to as ACK data frame) (S1502). Here, the receiving device notifies the transmission device of the feedback information by adding the feedback information to the ACK data frame to be transmitted for notifying whether or not the data frame #1 is received without an error.

Next, the transmission device receives the feedback information together with the ACK data frame. Subsequently, the transmission device determines the transmission parameter based on the received feedback information, and transmits the data frame #2 using the determined transmission parameter (S1503).

After that, each time the data frame is received, the receiving device measures the received signal level, notifies the transmission device of the feedback information. The transmission device transmits the next data frame using a transmission parameter determined based on the notified feedback information.

Next, a case in which the burst transmission illustrated in FIG. 15B is performed shall be described. More specifically, a case in which N data frames are continuously transmitted from the transmission device to the receiving device shall be described with reference to FIG. 15B.

First, the transmission device continuously transmits the data frame #1 to the data frame #N to the receiving device (S1601). Next, the receiving device receives the data frame #1 to the data frame #N and measures the received signal levels each of which is the reception signal level when receiving one of the data frames #1 to the data frame #N. Subsequently, the receiving device generates the feedback information based on the average value of the measured received signal levels. After that, the receiving device notifies the transmission device of the generated feedback information together with the ACK data frame (S1602). Here, the receiving device notifies the transmission device of the feedback information by adding the generated feedback information to the ACK frame.

Next, the transmission device receives the feedback information together with the ACK data frame. Subsequently, the transmission device determines the transmission parameter based on the received feedback information, and transmits the data frame #N+1 to the data frame #2N using the determined transmission parameter (S1603).

After that, each time the N data frames transmitted by burst transmission are received, the receiving device measures the received signal level and notifies the transmission device of the feedback information, and the transmission device performs the next burst transmission using the transmission parameter determined based on the notified feedback information.

As described above, when performing the burst transmission, the reception device notifies the transmission device of the feedback information after the data frames are continuously transmitted from the transmission device. Accordingly, the interval for notifying the feedback information increases in proportion to the number of data frames continuously transmitted in one burst transmission.

However, when the interval for notifying the feedback information is long as described above, there is a possibility that the reception quality significantly varies while performing communication for burst transmission using the same PHY rate. For example, in the case where the reception quality deteriorates while communicating data by burst transmission at the same PHY rate; it is highly likely for the frames received by the receiving device to include errors at the PHY rate being used. Thus, the number of frames to be resent increases, which lowers the throughput. In contrast, in the case where the reception quality improves while communicating data by burst transmission at the same PHY rate, the communication is performed at the PHY rate with lower transmission efficiency than a PHY rate that is actually available, also resulting in a lowered throughput. Here, the throughput refers to the effective transmission rate of a communication path per unit time; that is, a substantive transmission rate between communication devices (effective transmission rate).

In response to this problem, Patent Literature 1 (Japanese Unexamined Patent Application Publication No. 2009-124738) discloses a method in which the transmission device predicts a reception quality in the future and feeds back the predicted reception quality to be used to the reception quality at the time of subsequent data transmission as described in FIG. 16A, for example. Note that, FIG. 16A schematically illustrates the method in Patent Literature 1.

In addition, in Patent Literature 2 (Japanese Unexamined Patent Application Publication No. 2007-335994, for example, discloses a method in which a threshold is set in a time period for acceptable feedback delay, and information that was fed back exceeding the threshold is not used.

FIG. 16B illustrates the configuration of the transmission/receiving device disclosed in Patent Literature 2. The transmission/receiving device illustrated In FIG. 16B includes a channel change estimating unit 710, a response time threshold determining unit 711, a receiver, a transmitter, an MAC protocol processing unit, and a control unit. The channel fluctuation estimating unit 710 estimates a fluctuation cycle of a channel, and the response time threshold determining unit 711 determines a threshold of the response time, based on the fluctuation cycle estimated by the channel change estimating unit 710. With the configuration described above, the transmission/reception device illustrated in FIG. 16B controls the reception quality information such that feedback information equal to or less than the threshold is used at the time of subsequent data transmission using the periodicity of the change in the reception quality.

SUMMARY OF THE INVENTION

However, according to the method disclosed in Patent Literature 1, prediction is performed supposing that the past or current reception quality and a reception quality in the future are correlated. For this reason, in the case where the reception quality varies at random and the past or current reception quality and the future reception quality are not correlated, the reception quality is not appropriately predicted. In other words, according to the method disclosed in Patent Literature 1, an appropriate PHY rate cannot be used, following the change in the reception signal.

In addition, the method disclosed in Patent Literature 2 performs the control using the periodicity of the change in the reception quality. Thus, it is not applicable when the reception quality varies at random without any periodicity. In other words, according to the method disclosed in Patent Literature 2, an appropriate PHY rate cannot be used, following the change in the reception signal.

The following describes the random change in the reception quality with reference to the diagrams.

For example, in infrared communication by communication devices such as mobile terminals, the change in the reception quality is dominantly caused by the hand movement of the user who uses the communication device. In addition, the change also occurs by various factors such as the user, the posture of the user at the time of communication, and the shape of the communication device.

FIG. 17 is a diagram for explaining the fluctuation in the reception quality of the infrared communication by the communication device in a situation with hand movements.

The upper graph in FIG. 17 indicates an example of displacement of optical axis caused by hand movements. Here, the vertical axis indicates the dimension of displacement (mm), and the horizontal axis indicates time (sec). As illustrated in the upper graph in FIG. 17, the displacement of the optical axis fluctuates at random due to the hand movements.

The lower graph in FIG. 17 is a graph illustrating an evaluation of the throughput efficiency by simulation when an adaptive PHY rate control is applied in a part of the period in the upper graph (the period of one second indicated by dotted lines). Here, the vertical axis indicates the throughput efficiency, and the horizontal axis indicates time. The throughput efficiency here indicates a value of the throughput in the media access control (MAC) layer normalized by the maximum available PHY rate.

In the lower graph in FIG. 17, the solid lines (b) illustrates the throughput efficiency when the transmission device which performs burst transmission performs an adaptive PHY rate control based on the feedback information from the receiving device. The broken lines (a) indicate a result of simulation when the transmission device always transmits data frames at a PHY rate appropriate to the reception quality; that is, when an ideal PHY rate control without a delay in the feedback notification is performed. Here, in this simulation, two PHY rates, namely, 1 Gbps and 512 Mbps are used while switching between the two. In addition, it is assumed that the size of data frame is 64 KB (when the PHY rate is 1 Gbps, it takes approximately 500 μs for transmission), and the number of data frames transmitted by one burst transmission is 128 (when the PHY rate is 1 Gbps, it takes approximately 64 ms for transmission).

As illustrated in the lower graph of FIG. 17, in the areas surrounded by the circles, the throughput efficiency when the adaptive PHY rate control based on the feedback information is performed (solid lines (b)) is significantly lower than the throughput efficiency when the ideal adaptive PHY rate control is performed (broken lines (a).

This is because; the PHY rate is not switched to the PHY rate appropriate to the reception quality even if the reception quality changes during the burst transmission of the data frames. This is due to the fact that, in communication using burst transmission, the interval for notifying the feedback information is long as described above. In other words, even if the reception quality changes, the transmission of the data frames using a PHY rate not suitable to the reception quality continues after the change.

The present invention has been conceived in view of these problems, and it is an object of the present invention to provide a communication device and a communication method which allow an appropriate selection of the PHY rate following the change in the reception signal level even in a circumstance where the reception quality changes at random.

In order to solve the above-described problems, the communication device according to an aspect of the present invention is a communication device which receives data frames transmitted by another communication device, the communication device including: a receiving unit which receives data frames for each block including data frames continuously transmitted by the other communication device; a measuring unit which measures a reception quality of the block received by the receiving unit; a physical layer (PHY) rate determining unit which determines, based on the reception quality of the block measured by the measuring unit, a PHY rate that is used by the other communication device for transmitting data frames included in a next block which is immediately after the block; a block size control unit which determines, based on the reception quality of the block measured by the measuring unit, a block size indicating the number of data frames to be included in the next block by the other communication device; and a transmission unit which transmits feedback information including the PHY rate determined by the PHY rate determining unit and the block size determined by the block size control unit to the other communication device, in which the block size control unit determines the block size to be a value smaller than a maximum value of a block size that can be transmitted by the other communication device, when a value indicating the reception quality of the block is within a predetermined range including a PHY rate threshold which is a threshold for changing a PHY rate.

This configuration allows an implementation of the communication device capable of selecting an appropriate PHY rate according to the fluctuation in the received signal level.

In addition, the communication device according to an aspect of the present invention is a communication device which transmits, to another communication device, data frames for each block including continuous data frames, the communication device including: a receiving unit which receives, from the other communication device, feedback information including a PHY rate that is used by the communication device for transmitting each block and a block size indicating the number of data frames included in the block; a data control unit which generates the block according to the block size included in the feedback information received by the receiving unit; and a transmission unit which modulates the block generated by the data control unit at the PHY rate included in the feedback information and to transmit the modulated block to the other communication device, in which the feedback information is determined based on a reception quality of a signal received by the other communication device, and the block size is determined to be a value smaller than a maximum value of a block size that can be transmitted by the communication device, when a value indicating the reception quality of the block is within a predetermined range including a PHY rate threshold which is a threshold for changing a PHY rate.

Furthermore, a reception method performed by the communication device according to an aspect of the present invention is a communication method for a communication device which receives data frames transmitted by another communication device, the communication method including: receiving data frames for each block including data frames continuously transmitted by the other communication device; measuring a reception quality of the block received in the receiving; determining, based on the reception quality of the block measured in the measuring, a PHY rate that is used by the other communication device for transmitting data frames included in a next block which is immediately after the block; determining, based on the reception quality of the block measured by the measuring, a block size indicating the number of data frames to be included in the next block by the other communication device; and transmitting feedback information including the PHY rate determined by the determining of PHY rate and the block size determined by the determining of block size to the other communication device, in which the determining of a block size further includes determining the block size to be a value smaller than a maximum value of a block size that can be transmitted by the other communication device, when a value indicating the reception quality of the block is within a predetermined range including a PHY rate threshold which is a threshold for changing a PHY rate.

Furthermore, a transmission method performed by the communication device according to an aspect of the present invention is a communication method for a communication device which transmits, to another communication device, data frames for each block including continuous data frames, the communication method comprising: receiving, from the other communication device, feedback information including a PHY rate that is used by the communication device for transmitting each block and a block size indicating the number of data frames included in the block; generating the block according to the block size included in the feedback information received in the receiving; and modulating the block generated by the generating at the PHY rate included in the feedback information and transmitting the modulated block to the other communication device, in which the feedback information is determined based on a reception quality of a signal received by the other communication device, and the block size is determined to be a value smaller than a maximum value of a block size that can be transmitted by the communication device, when a value indicating the reception quality of the block is within a predetermined range including a PHY rate threshold which is a threshold for changing a PHY rate.

The present invention allows an implementation of a transmission and receiving device and a transmission and receiving method capable of selecting an appropriate PHY rate in accordance with the fluctuation in the received signal level. More specifically, it is possible to reduce the size of a block to be transmitted at a point in time a necessity for changing the PHY rate arises, suppressing the reduction in the transmission efficiency.

Further Information about Technical Background to this Application

The disclosure of Japanese Patent Application No. 2010-039701 filed on Feb. 25, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

The following describes an example of embodiments of the present invention with reference to the drawings.

Embodiment 1

Figure 1:
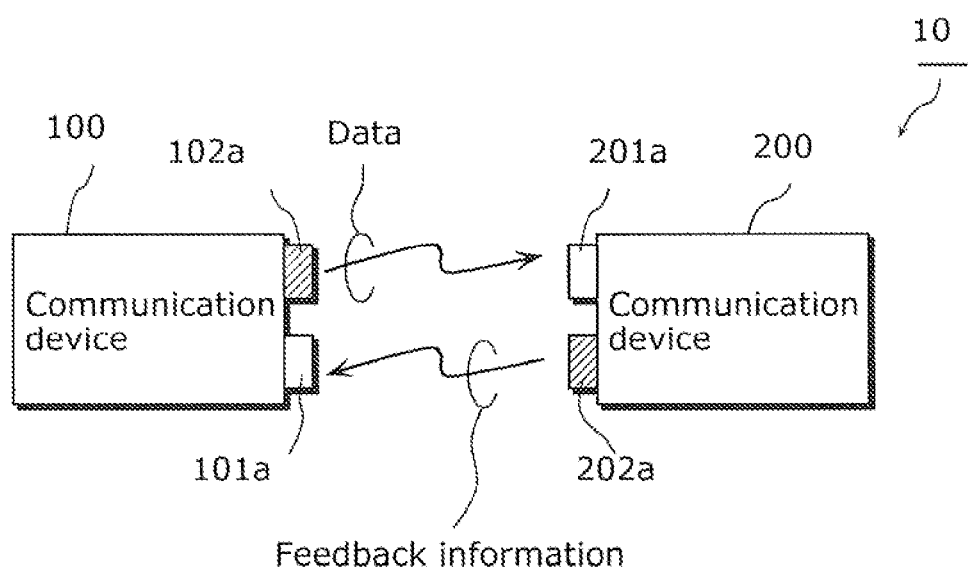
FIG. 1 illustrates an exemplary configuration of the communication system according to Embodiment 1.

FIG. 1 illustrates an exemplary configuration of the communication system according to Embodiment 1.

The communication system 10 illustrated in FIG. 1 includes a communication device 100 and a communication device 200. The communication device 100 and the communication device 200 are infrared communication devices which perform communication using infrared light. The communication device 100 and the communication device 200 are both mobile terminals performing high-speed transmission, and are mobile phones, for example.

The communication device 100 transmits optical signal generated by modulating the data to the communication device 200. In addition, the communication device 100 receives a feedback signal from the communication device 200. Here, in FIG. 1, the transmission unit 102a outputs (emits) infrared light for infrared communication, and the receiving unit 101a receives the infrared light for infrared communication.

The communication device 200 obtains the data by receiving the optical signal transmitted from the communication device 100 and modulating the optical signal, generates the feedback information based on the received optical signals, and transmits the generated feedback information to the communication device 100. Here, in FIG. 1, the receiving unit 201a receives the infrared light for infrared communication and the transmission unit 202a outputs (emits) infrared light for infrared communication.

Figure 2:
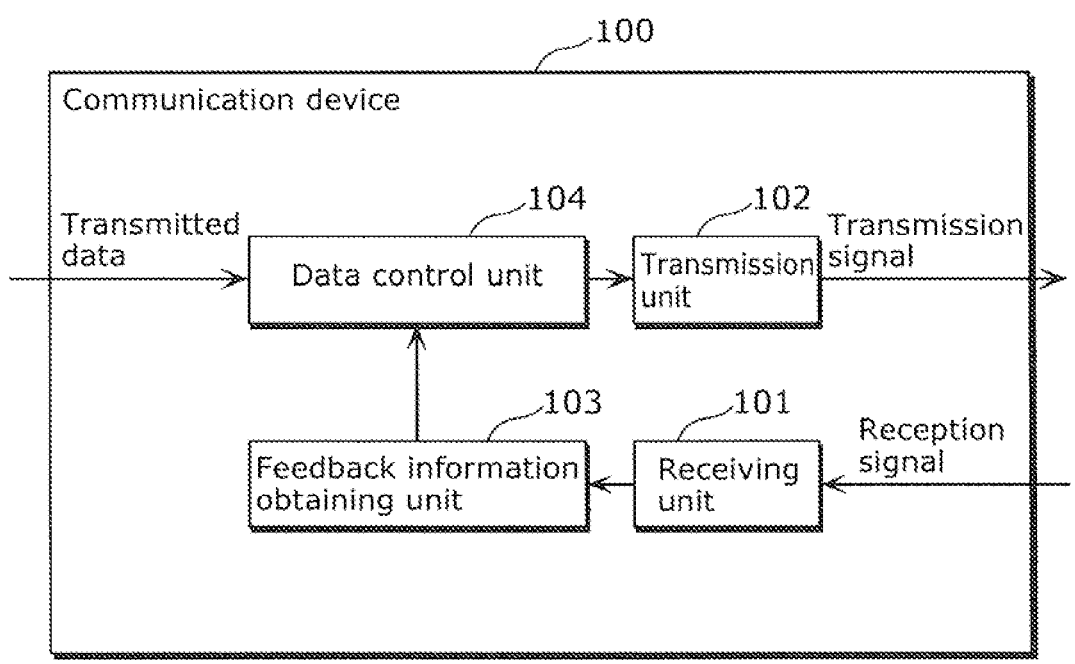
FIG. 2 is a block diagram illustrating the configuration of the communication device 100 according to Embodiment 1.

FIG. 2 is a block diagram illustrating the configuration of the communication device 100 according to Embodiment 1. As described above, the communication device 100 illustrated in FIG. 2 is an infrared communication device, for example, and is the communication device which transmits data frames included in a block to the communication device 200 for each block. The communication device 100 includes a receiving unit 101, the transmission unit 102, a feedback information obtaining unit 103, and the data control unit 104.

The receiving unit 101 receives data frames for each block including data frames continuously transmitted by the communication device 100 which is the transmission device. More specifically, the receiving unit 101 receives the optical signal transmitted from the communication device 200, and performs processes for reception such as converting an analog signal into a digital signal (hereafter referred to as A/D conversion) and modulating the signal. According to this embodiment, the receiving unit 101 receives a feedback frame including the feedback information, and performs the reception processing. In addition, the receiving unit 101 includes the receiving unit 101a illustrated in FIG. 1.

The transmission unit 102 transmits the feedback information including the PHY rate determined by the PHY rate determining unit 206 and the block size determined by the block size control unit 210 to the transmission device. More specifically, the transmission unit 102 performs transmission processing such as conversion from the digital signal to the analog signal (hereafter referred to as D/A conversion) and modulation. In addition, the transmission unit 102 includes the transmission unit 102a as illustrated in FIG. 1.

The feedback information obtaining unit 103 obtains the feedback information from the ACK data frame (feedback frame) received from the receiving unit 101. In this embodiment, the feedback information obtaining unit 103 obtains the PHY rate information and the block size information as the feedback information.

The data control unit 104 generates blocks according to the block size included in the feedback information received by the receiving unit 101. More specifically, the data control unit 104 instructs the transmission unit 102 to transmit the data, based on the feedback information including the PHY rate information and the block size information obtained by the feedback information obtaining unit 103.

The communication device 100 is configured as described above.

Figure 3:
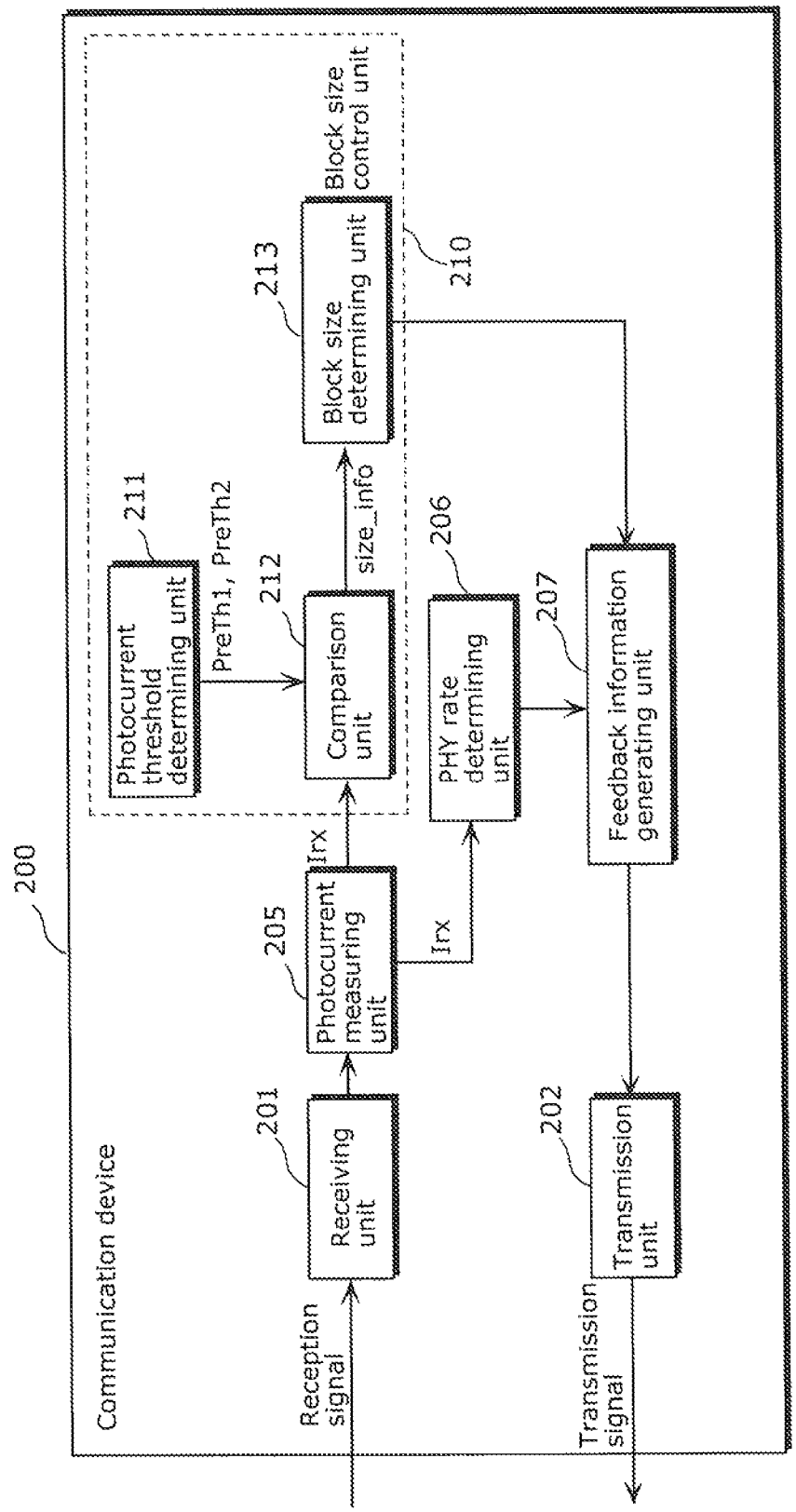
FIG. 3 is a block diagram illustrating the configuration of the communication device 200 according to Embodiment 1.

FIG. 3 is a block diagram illustrating the configuration of the communication device 200 according to Embodiment 1.

As described above, the communication device 200 illustrated in FIG. 3 is an infrared communication device, for example, and is a communication device which receives data frames transmitted by the communication device 100. The communication device 200 includes a receiving unit 201, a transmission unit 202, a photocurrent measuring unit 205, a PHY rate determining unit 206, a feedback information generating unit 207, and a block size control unit 210.

The receiving unit 201 receives data frames for each block including data frames continuously transmitted by the other communication device. More specifically, the receiving unit 201 receives the optical signal transmitted from the communication device 100, and performs reception processing on the received signal such as A/D conversion and modulation. In addition, the receiving unit 201 includes the receiving unit 201a illustrated in FIG. 1.

The transmission unit 202 transmits feedback information including the PHY rate determined by the PHY rate determining unit and the block size determined by the block size determining unit 213 to the communication device 100, which is the transmission device. More specifically, the optical signal is generated by performing the transmission process such as D/A conversion and modulation, and the generated optical signal is transmitted to the communication device 100. In addition, the transmission unit 202 includes the transmission unit 202a as illustrated in FIG. 1.

The photocurrent measuring unit 205 is equivalent to the measuring unit according to the present invention, and measures a reception quality of the block received by the receiving unit 201. For example, when the communication device 100 transmits the data frames included in the blocks as the optical signal, the photocurrent measuring unit 205 measures the photocurrent for each of the data frames included in the block received by the receiving unit, and calculates an average value of the photocurrent of the data frames, in order to measure the reception quality of the block. Here, the optical signal is an infrared signal used in the infrared communication, for example. More specifically, the photocurrent measuring unit 205 measures the photocurrent of the signal received by the receiving unit 201 to calculate the average value Irx of the photocurrent in one block.

The PHY rate determining unit 206 determines a PHY rate used by the transmission device (communication device 100) for transmitting a block next to the block, based on the reception quality measured by the photocurrent measuring unit 205. More specifically, the PHY rate determining unit 206 determines an appropriate PHY rate according to the photocurrent value Irx measured by the photocurrent measuring unit 205 and generates the PHY rate information. Here, the PHY rate determining unit 206 determines a PHY rate appropriate for each block. Note that, as described above, the PHY rate includes multi-value modulation, a coding rate, and a bandwidth.

The block size control unit 210 determines, based on the reception quality of the block measured by the photocurrent measuring unit 205, a block size indicating the number of data frames to be included in the next block by the communication device 100. The block size control unit 210 determines the block size to be a value smaller than a maximum value of a block size that can be transmitted by the other communication device, when a value indicating the reception quality of the block is within a predetermined range including a PHY rate threshold which is a threshold for changing a PHY rate. Note that, the maximum value is determined by the communication standard. For example, when the PHY rate is 1 Gbps, the size of the data frame is 64 KB (approximately 500 µs is required to transmit the data frame), and the maximum number of data frames transmitted by one burst transmission is a block size that consists of 128 data frames. In addition, when the value indicating the reception quality of the block is within the predetermined range, the block size control unit 210 determines the block size to be a block size smaller than a block size determined when the value indicating the reception quality is out of the predetermined range.

More specifically, the block size control unit 210 determines a block size at the time of burst transmission, according to the photocurrent Irx measured by the photocurrent measuring unit 205, and generates the block size information.

Here, the following describes an example of the detailed configuration of the block size control unit 210. The block size control unit 210 includes, for example, the photocurrent threshold determining unit 211, a comparison unit 212, and a block size determining unit 213.

The photocurrent threshold determining unit 211 determines a threshold of the photocurrent for controlling the block size (photocurrent pre-threshold). The photocurrent threshold determining unit 211 determines two values as the photocurrent pre-threshold, for example, PreTh1 and PreTh2. In addition, the photocurrent threshold determining unit 211 determines four values as photocurrent pre-thresholds, for example, PreTh1, PreTh2, PreTh3, and PreTh4.

Note that the predetermined range is defined by PreTh1 and PreTh2, for example. The predetermined range is set to a range corresponding to a period longer than a period from when the communication device 100 transmits the next block to the communication device 200 to when the communication device 100 receives feedback information for the next block, the communication device 100 using a block size determined by the block size control unit when the value indicating the reception quality of the block is out of the predetermined range.

The comparison unit 212 generates control information of block size, size_info, based on the photocurrent Irx measured by the measuring unit 111 and pre-thresholds PreTh1 and PreTh2. Here, the value of size_info is set to be "0" when there is no change in the block size, "1" when the block size is to be reduced, and "2" when the block size is to be increased. In addition, the comparison unit 212 holds a State indicating a state of current block size, and the State indicating the state of the block size is initialized to be "2" when starting the transmission, and the State indicating the state of block size is updated each time the block size is changed.

The block size determining unit 213 determines the block size based on size_info, which is the control information of the block size, and determines the value as the block size information.

The block size control unit 210 is configured as described above. The following further describes the configuration of the communication device 200.

The feedback information generating unit 207 generates a feedback frame including the feedback information to be notified of the communication device 100. In this embodiment, the feedback information includes the PHY rate information and the block size information. Thus, the feedback information generating unit 207 generates the feedback frame including the PHY rate information and the block size information. The feedback frame generated in the feedback information generating unit 207 is transmitted from the transmission unit 202 to the communication device 100.

The communication device 200 is configured as described above.

Next, the following describes a process performed by the comparison unit 212 each time data frames included in the block is received with reference to the drawing. Note that, in the following description, receiving, per block, data frames included in the block is referred to as receiving a block.

Figure 4:
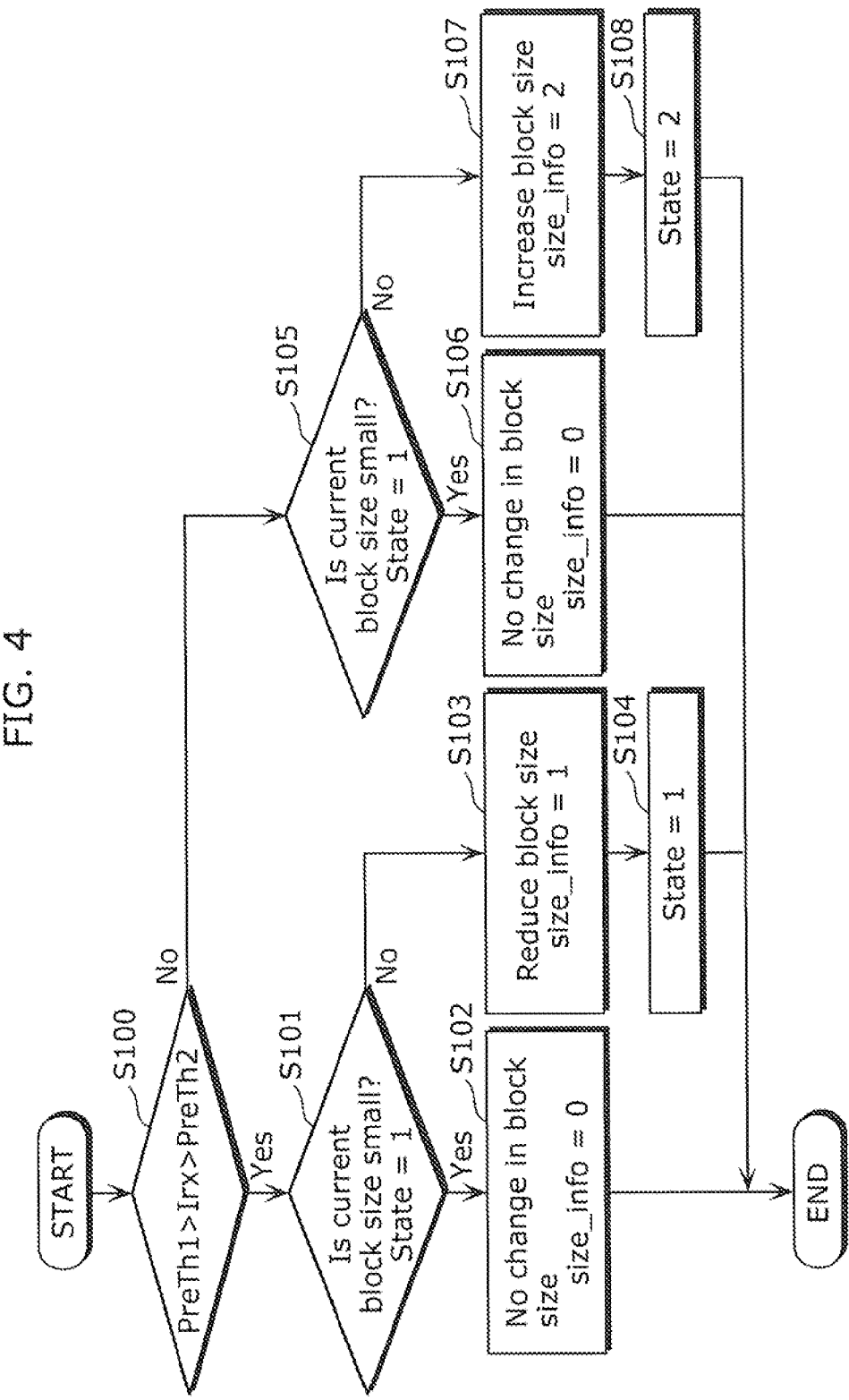
FIG. 4 is a flowchart illustrating the flow when the comparison unit determines block size according to Embodiment 1.

FIG. 4 is a flowchart illustrating the process performed by the comparison unit according to Embodiment 1 of the present invention.

First, the comparison unit 212 compares the average photocurrent Irx input from the photocurrent measuring unit 205 and the pre-threshold PreTh1 and the pre-threshold PreTh2 of the photocurrent input from the photocurrent threshold determining unit 211. More specifically, the comparison unit 212 determines whether or not the average photocurrent Irx is smaller than the pre-threshold PreTh1 and larger than the pre-threshold PreTh2 (S100).

In S100, when it is determined that the average photocurrent Irx satisfies the above condition (Yes In S100), the comparison unit 212 determines whether or not the value of State indicating the state of current block size is small (State being "1") (S101).

Note that, here, the value of State indicating the state of current block size has only two types, namely, small (State being "1") and large (State being "0"). When the value of State indicating the state of block size is small, the number of data frames to be continuously transmitted in one burst transmission is small, for example, 64 data frames. In addition, when the value of State indicating the state of block size is large, the number of data frames continuously transmitted in one burst transmission is large, for example, 128 data frames.

Next, when it is determined that the current block size is small (Yes in S101), the comparison unit 212 sets the value of the block size Information size_info at "0" (S102). In other words, the comparison unit 212 sets the block size information that indicates that it is not necessary to change the block size.

In contrast, when it is determined that the state of the current block size is not small (that is, large) (No in S101), the comparison unit 212 sets the value of the block size information size_info at "1" (S103). In other words, the comparison unit 212 sets the block size information indicating that it is necessary to change the block size to a smaller block size.

Subsequently, the comparison unit 212 updates the State indicating the state of current block size to "1", and ends the process.

In addition, in S100, when it is determined that the condition described above is not satisfied, the process proceeds to S105, and the comparison unit 212 determines whether or not the State indicating the state of the current block size is large (State being "2") (S105).

When it is determined that the state of current block size is large in S105 (Yes in S105), the comparison unit 212 sets the value of the block size information size_info at "0" (S106), and ends the process.

In contrast, when It is determined that the state of current block size is small in S105 (No in S105), the comparison unit 212 sets the value of the block size information size_info at "2" (S107).

Subsequently, the comparison unit 212 updates the State indicating the state of current block size to "2" (S108), and ends the process.

The comparison unit 212 determines the block size as described above.

Next, an exemplary operation of the communication device 100 and the communication device 200 configured as described above shall be described with reference to the drawing.

Figure 5:
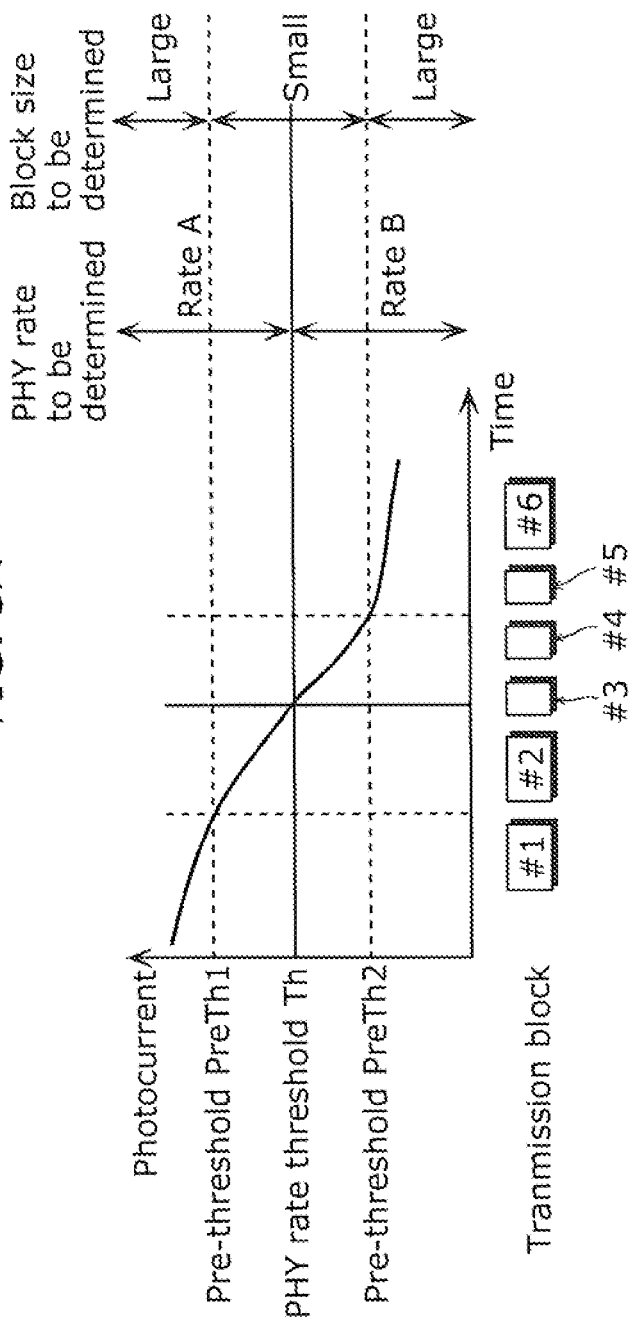
FIG. 5A illustrates an example of the control of PHY rate and block size performed by the communication device 100 and the communication device 200 according to Embodiment 1.
FIG. 5B illustrates an example of the control of PHY rate and block size performed by the communication device 100 and the communication device 200 according to Embodiment 1.

FIGS. 5A and 5B illustrate an example of the control of PHY rate and block size performed by the communication device 100 and the communication device 200 according to Embodiment 1. FIG. 5A illustrates a change in photocurrent and blocks which are transmitted from the communication device 100. FIG. 5B is a chart illustrating the PHY rate and the block size used for transmitting each block by the communication device 100. In addition, in FIG. 5A, the horizontal axis indicates time, and the vertical axis indicates photocurrent, the block to be transferred at that time by burst transmission, and the number of the blocks are illustrated under the graph.

With reference to FIGS. 5A and 5B, an exemplary operation In a case where the reception quality transitions from good to bad; that is, a case where the photocurrent decreases over time shall be described. The following indicates an example of the premise for description. It is assumed that communication device 100 performs 6 burst transmissions and transmits the blocks #1 to #6 to the communication device 200. In addition, the PHY rate determining unit 206 in the communication device 200 determines the rate A when the photocurrent Irx measured by the photocurrent measuring unit 205 exceeds the PHY rate threshold Th, and determines the rate B when the photocurrent Irx falls below the PHY rate threshold Th. The rate A is, for example, 1 Gbps, and the rate B is, for example, 512 Mbps. However, the rates are not limited to this example. In addition, it is assumed that the block size control unit 210 determines one of two block sizes, namely, large and small, based on the reception quality measured by the photocurrent measuring unit 205. It is assumed that the large block size is the size of a block including 128 data frames, for example. This is because the maximum number of data frames that can be transmitted by one burst transmission is 128 when the PHY rate is 1 Gbps. It is assumed that the small block size is a size of block Including 64 data frames, for example. Needless to say, the block sizes are not limited to this example.

First, the communication device 100 transmits the block #1 at the PHY rate "A", and the block size "Large", based on the feedback information transmitted in advance from the communication device 200.

Subsequently, the communication device 200 which received the block #1 performs the following process.

First, the PHY rate determining unit 206 compares the PHY rate threshold Th and the photocurrent Irx measured as the reception quality of the block #1 received by the receiving unit 201. As illustrated in FIG. 5A, the photocurrent Irx is equal to or higher than the PHY rate threshold, the PHY rate determining unit 206 determines the PHY rate at which the communication device 100 should transmit the data next time to be "A".

Subsequently, the comparison unit 212 compares the photocurrent Irx measured as the reception quality of the block #1 received by the receiving unit 201 and the pre-threshold PreTh1 and the pre-threshold PreTh2. Here, the value of State indicating the current state of the block size (initial value) is "2". In addition, since the photocurrent Irx is larger than the pre-threshold PreTh1 as illustrated in FIG. 5A, the comparison unit 212 determines the block size that should be determined by the block size determining unit 213 is large. Thus, the comparison unit 212 determines that it is not necessary to change the block size since the State indicating the current state of block size (initial value) is "2", and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is large.

Subsequently, the feedback information generating unit 207 generates the feedback information Including the PHY rate "A", and the block size "large".

Subsequently, the transmission unit (202) transmits (feeds back) the feedback information generated in the feedback information generating unit 207 to the communication device 100 after the reception of the block #1 is completed.

Next, the communication device 100 receives the feedback information in response to the block #1, and transmits the block #2 at the PHY rate "A", and the block size "large" to the communication device 200.

Subsequently, the communication device 200 which received the block #2 performs the following process.

First, the PHY rate determining unit 206 compares the PHY rate threshold Th and the photocurrent Irx measured as the reception quality of the block #2 received by the receiving unit 201. As illustrated in FIG. 5A, the photocurrent Irx is equal to or higher than the PHY rate threshold, the PHY rate determining unit 206 determines the PHY rate at which the communication device 100 should transmit the data next time to be "A".

Subsequently, the comparison unit 212 compares the photocurrent Irx measured as the reception quality of the block #2 received by the receiving unit 201 and the pre-threshold PreTh1 and the pre-threshold PreTh2. Here, the value of State indicating the current state of the block size is "2". In addition, as illustrated in FIG. 5A, the photocurrent Irx is smaller than the pre-threshold PreTh1 and larger than the pre-threshold PreTh2, and thus, the comparison unit 212 determines that the block size that should be determined by the block size determining unit 213 is small. Since the value of State indicating the current block size state is "2", the comparison unit 212 determines that it is necessary to reduce the block size, and outputs size_info indicating "1" to the block size determining unit 213 as the comparison result. At the same time, the comparison unit 212 updates the value of State indicating the block size state to "1".

Subsequently, since size_info input from the comparison unit 212 is "1", the block size determining unit 213 determines that the block size that the communication device 100 should use for transmission next time is small.

Subsequently, the feedback information generating unit 207 generates the feedback information including the PHY rate "A", and the block size "small".

Subsequently, the transmission unit 202 transmits (feeds back) the feedback information generated in the feedback information generating unit 207 to the communication device 100 after the reception of the block #2 is completed.

Next, the communication device 100 receives the feedback information in response to the block #2, and transmits the block #3 at the PHY rate "A", and the block size "small" to the communication device 200, based on the received feedback information.

Subsequently, the communication device 200 which received the block #3 performs the following process.

First, the PHY rate determining unit 206 compares the PHY rate threshold Th and the photocurrent Irx measured as the reception quality of the block #3 received by the receiving unit 201. Since the photocurrent Irx is smaller than the PHY rate threshold as illustrated in FIG. 5A, the PHY rate determining unit 206 determines the PHY rate that the communication device 100 should use for next transmission to be "B".

Subsequently, the comparison unit 212 compares the photocurrent Irx measured as the reception quality of the block #3 received by the receiving unit 201 and the pre-threshold PreTh1 and the pre-threshold PreTh2. Here, the value of State indicating the current state of the block size is "1". In addition, as illustrated in FIG. 5A, the photocurrent Irx is smaller than the pre-threshold PreTh1 and larger than the pre-threshold PreTh2, and thus, the comparison unit 212 determines that the block size to be determined by the block size determining unit 213 is small. Since the value of State indicating the current block size state is "1", the comparison unit 212 determines that it is not necessary to reduce the block size, and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is small.

Subsequently, the feedback information generating unit 207 generates the feedback information including the PHY rate "B" and the block size "small".

Subsequently, the transmission unit 202 transmits (feeds back) the feedback information generated in the feedback information generating unit 207 to the communication device 100 after the reception of the block #3 is completed.

Next, the communication device 100 receives the feedback information in response to the block #3, and transmits the block #4 at the PHY rate "B", and the block size "small" to the communication device 200.

Subsequently, the communication device 200 which received the block #4 performs the following process.

First, the PHY rate determining unit 206 compares the PHY rate threshold Th and the photocurrent Irx measured as the reception quality of the block #4 received by the receiving unit 201. Since the photocurrent Irx is smaller than the PHY rate threshold as illustrated in FIG. 5A, the PHY rate determining unit 206 determines the PHY rate that the communication device 100 should use for transmission next time to be "B".

Subsequently, the comparison unit 212 compares the photocurrent Irx measured as the reception quality of the block #4 received by the receiving unit 201 and the pre-threshold PreTh1 and the pre-threshold PreTh2. Here, the value of State indicating the current state of the block size is "1". In addition, as illustrated in FIG. 5A, the photocurrent Irx is smaller than the pre-threshold PreTh1 and larger than the pre-threshold PreTh2, and thus, the comparison unit 212 determines that the block size to be determined by the block size determining unit 213 is small. Since the value of State indicating the current block size state is "1", the comparison unit 212 determines that it is necessary to reduce the block size, and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is small.

Subsequently, the feedback information generating unit 207 generates the feedback information including the PHY rate "B" and the block size "small".

Subsequently, the transmission unit 202 transmits (feeds back) the feedback information generated in the feedback information generating unit 207 to the communication device 100 after the reception of the block #4 is completed.

Next, the communication device 100 receives the feedback information in response to the block #4, and transmits the block #5 at the PHY rate "B", and the block size "small" to the communication device 200.

Subsequently, the communication device 200 which received the block #5 performs the following process.

First, the PHY rate determining unit 206 compares the PHY rate threshold Th and the photocurrent Irx measured as the reception quality of the block #5 received by the receiving unit 201. Since the photocurrent Irx is smaller than the PHY rate threshold as illustrated in FIG. 5A, the PHY rate determining unit 206 determines the PHY rate that the communication device 100 should use for the next transmission to be "B".

Subsequently, the comparison unit 212 compares the photocurrent Irx measured as the reception quality of the block #5 received by the receiving unit 201 and the pre-threshold PreTh1 and the pre-threshold PreTh2. Here, the value of State indicating the current state of the block size is "1". In addition, since the photocurrent Irx is smaller than the pre-threshold PreTh2 as illustrated in FIG. 5A, the comparison unit 212 determines the block size to be determined by the block size determining unit 213 is large. Since the value of State indicating the current block size state is "1", the comparison unit 212 determines that it is necessary to reduce the block size, and outputs size_info indicating "2" to the block size determining unit 213 as the comparison result. At the same time, the comparison unit 212 updates the value of State indicating the block size state to "2".

Subsequently, since size_info input from the comparison unit 212 is "2", the block size determining unit 213 determines that the block size that the communication device 100 should use for transmission next time is large.

Subsequently, the feedback information generating unit 207 generates the feedback information including the PHY rate "13" and the block size "large".

Subsequently, the transmission unit 202 transmits (feeds back) the feedback information generated in the feedback information generating unit 207 to the communication device 100 after the reception of the block #5 is completed.

Next, the communication device 100 receives the feedback information in response to the block #5, and transmits the block #6 at the PHY rate "B", and the block size "large" to the communication device 200.

As such, in this embodiment, the block size used for burst transmission is reduced when the photocurrent indicating the reception quality is included in a predetermined range including the PHY rate threshold which requires switching of the PHY rate; that is, in a range between the pre-thresholds PreTh1 and PreTh2 which includes a PHY rate threshold that requires switching of the PHY rate in between. With this, the block in a small block size is transmitted at (or around) the time when the photocurrent falls below the PHY rate, which shortens the time between the point in time when the photocurrent falls below the PHY rate threshold and the point in time when the PHY rate is switched, thereby suppressing the reduction in the transmission efficiency.

In addition, in this embodiment, even after the photocurrent falls below the PHY rate threshold, the transmission of the blocks in small block size continues until the photocurrent falls below the pre-threshold PreTh2. This produces an effect of allowing the PHY rate to be switched immediately even when the photocurrent Increases again while the transmission of the block in the small block size continues.

This configuration is particularly effective in a communication in which the reception quality varies at random, such as infrared communication using mobile terminals to which the present invention is directed.

Next, another operational example different from FIGS. 5A and 5B shall be explained with reference to the drawings.

Figure 6:
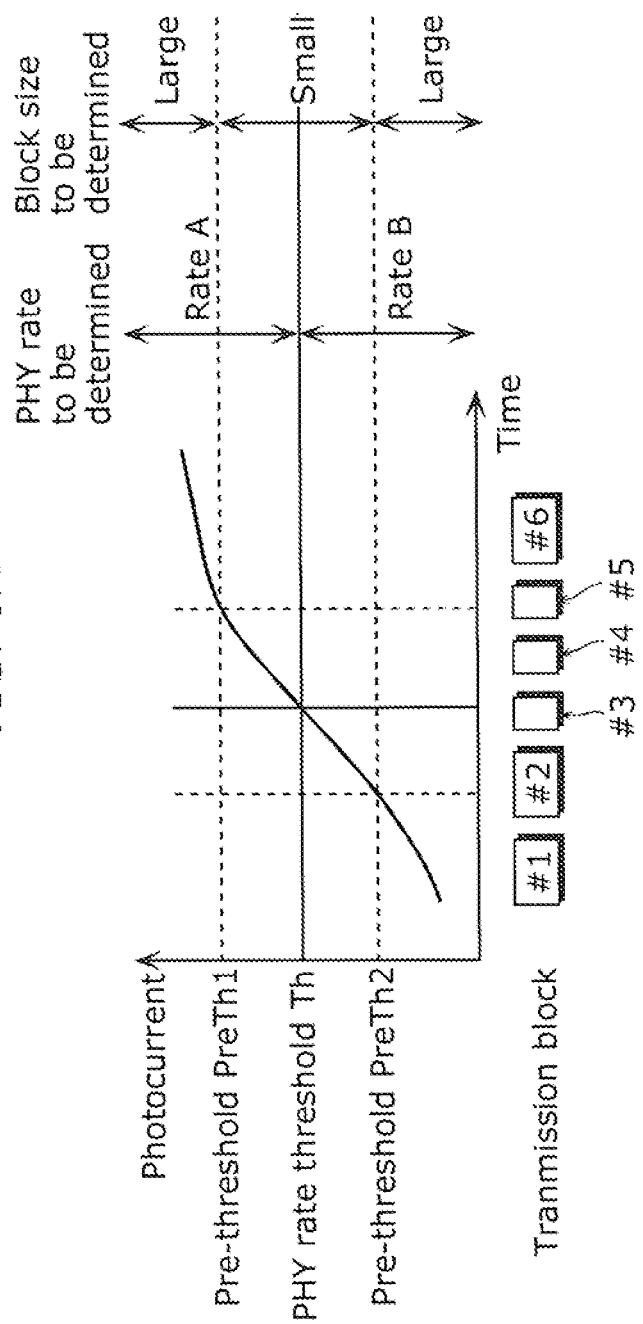
FIG. 6A illustrates an example of the control of PHY rate and block size performed by the communication device 100 and the communication device 200 according to Embodiment 1.
FIG. 6B illustrates an example of the control of PHY rate and block size performed by the communication device 100 and the communication device 200 according to Embodiment 1.

FIGS. 6A and 6B illustrate an example of the control of PHY rate and block size performed by the communication device 100 and the communication device 200 according to Embodiment 1. FIG. 6A illustrates a change in the photocurrent and the blocks which is transmitted from the communication device 100. FIG. 6B is a chart illustrating the PHY rate and the block size used for transmitting each block by the communication device 100. In addition, in FIG. 6A, the horizontal axis indicates time, the vertical axis indicates photocurrent, and the block to be transferred at that time and the number of the blocks are illustrated under the graph.

With reference to FIGS. 6A and 6B, an exemplary operation in a case where the reception quality transitions from bad to good; that is, a case where the photocurrent increases over time shall be described. Since the premises for the following description are identical to those for FIGS. 5A and 5B, the description for them is omitted here.

First, the communication device 100 transmits the block #1 at the PHY rate "B", and the block size "Large", based on the feedback information transmitted in advance from the communication device 200.

Subsequently, the communication device 200 which received the block #1 performs the following process.

First, the PHY rate determining unit 206 compares the PHY rate threshold Th and the photocurrent Irx measured as the reception quality of the block #1 received by the receiving unit 201. Since the photocurrent Irx is smaller than the PHY rate threshold as illustrated in FIG. 6A, the PHY rate determining unit 206 determines that the PHY rate that the communication device 100 should use for transmission next time to be "B".

Subsequently, the comparison unit 212 compares the photocurrent Irx measured as the reception quality of the block #1 received by the receiving unit 201 and the pre-threshold PreTh1 and the pre-threshold PreTh2. Here, the value of State indicating the current state of the block size (initial value) is "2". In addition, since the photocurrent Irx is smaller than the pre-threshold PreTh2 as illustrated in FIG. 6A, the comparison unit 212 determines that the block size that should be determined by the block size determining unit 213 is large. Thus, the comparison unit 212 determines that it is not necessary to change the block size since the State indicating the current state of block size (initial value) is "2", and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is large.

Subsequently, the feedback information generating unit 207 generates the feedback information including the PHY rate "B" and the block size "large".

Subsequently, the transmission unit 202 transmits (feeds back) the feedback information generated in the feedback information generating unit 207 to the communication device 100 after the reception of the block #1 is completed.

Next, the communication device 100 receives the feedback information in response to the block #1, and transmits the block #2 at the PHY rate "B", and the block size "large" to the communication device 200, based on the received feedback information.

Subsequently, the communication device 200 which received the block #2 performs the following process.

First, the PHY rate determining unit 206 compares the PHY rate threshold Th and the photocurrent Irx measured as the reception quality of the block #2 received by the receiving unit 201. Since the photocurrent Irx is smaller than the PHY rate threshold as illustrated in FIG. 6A, the PHY rate determining unit 206 determines the PHY rate that the communication device 100 should use for transmission next time to be "B".

Subsequently, the comparison unit 212 compares the photocurrent Irx measured as the reception quality of the block #2 received by the receiving unit 201 and the pre-threshold PreTh1 and the pre-threshold PreTh2. Here, the value of State indicating the current state of the block size is "2". In addition, as illustrated in FIG. 6A, the photocurrent Irx is smaller than the pre-threshold PreTh1 and larger than the pre-threshold PreTh2, and thus, the comparison unit 212 determines that the block size to be determined by the block size determining unit 213 is small. Since the value of State indicating the current block size state is "2", the comparison unit 212 determines that it is necessary to reduce the block size, and outputs size_info indicating "1" to the block size determining unit 213 as the comparison result. At the same time, the comparison unit 212 updates the value of State indicating the block size state to "1".

Subsequently, since size_info input from the comparison unit 212 is "1", the block size determining unit 213 determines that the block size that the communication device 100 should use for transmission next time is small.

Subsequently, the feedback information generating unit 207 generates the feedback information including the PHY rate "B" and the block size "small".

Subsequently, the transmission unit 202 transmits (feeds back) the feedback information generated in the feedback information generating unit 207 to the communication device 100 after the reception of the block #2 is completed.

Next, the communication device 100 receives the feedback information in response to the block #2, and transmits the block #3 at the PHY rate "B", and the block size "small" to the communication device 200.

Subsequently, the communication device 200 which received the block #3 performs the following process.

First, the PHY rate determining unit 206 compares the PHY rate threshold Th and the photocurrent Irx measured as the reception quality of the block #3 received by the receiving unit 201. Since the photocurrent Irx is smaller than the PHY rate threshold as illustrated in FIG. 6A, the PHY rate determining unit 206 determines the PHY rate that the communication device 100 should use for transmission next time to be "B".

Subsequently, the comparison unit 212 compares the photocurrent Irx measured as the reception quality of the block #3 received by the receiving unit 201 and the pre-threshold PreTh1 and the pre-threshold PreTh2. Here, the value of State indicating the current state of the block size is "1". In addition, as illustrated in FIG. 6A, the photocurrent Irx is smaller than the pre-threshold PreTh1 and larger than the pre-threshold PreTh2, and thus, the comparison unit 212 determines that the block size to be determined by the block size determining unit 213 is small. Since the value of State indicating the current block size state is "1", the comparison unit 212 determines that it is not necessary to change the block size, and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is small.

Subsequently, the feedback information generating unit 207 generates the feedback information including the PHY rate "B" and the block size "small".

Subsequently, the transmission unit 202 transmits (feeds back) the feedback information gene'rated in the feedback information generating unit 207 to the communication device 100 after the reception of the block #3 is completed.

Next, the communication device 100 receives the feedback information in response to the block #3, and transmits the block #4 at the PHY rate "B", and the block size "small" to the communication device 200.

Subsequently, the communication device 200 which received the block #4 performs the following process.

First, the PHY rate determining unit 206 compares the PHY rate threshold Th and the photocurrent Irx measured as the reception quality of the block #4 received by the receiving unit 201. Since the photocurrent Irx is larger than the PHY rate as illustrated in FIG. 6A, the PHY rate determining unit 206 determines the PHY rate that the communication device 100 should use for transmission next time to be "A".

Subsequently, the comparison unit 212 compares the photocurrent Irx measured as the reception quality of the block #4 received by the receiving unit 201 and the pre-threshold PreTh1 and the pre-threshold PreTh2. Here, the value of State indicating the current state of the block size is "1". In addition, as illustrated in FIG. 6A, the photocurrent Irx is smaller than the pre-threshold PreTh1 and larger than the pre-threshold PreTh2, and thus, the comparison unit 212 determines that the block size that should be determined by the block size determining unit 213 is small. Since the value of State indicating the current block size state is "1", the comparison unit 212 determines that it is not necessary to reduce the block size, and outputs size_info indicating "0" to the block size determining unit 213 as the comparison result.

Subsequently, since size_info input by the comparison unit 212 is "0", the block size determining unit 213 determines that the block size is not changed; that is, the block size that the communication device 100 shall use for the next transmission is small.

Subsequently, the feedback information generating unit 207 generates the feedback information including the PHY rate "A" and the block size "small".
Subsequently, the transmission unit 202 transmits (feeds back) the feedback information generated in the feedback information generating unit 207 to the communication device 100 after the reception of the block #4 is completed.

Next, the communication device 100 receives the feedback information in response to the block #4, and transmits the block #5 at the PHY rate "A", and the block size "small" to the communication device 200.

Subsequently, the communication device 200 which received the block #5 performs the following process.

First, the PHY rate determining unit 206 compares the PHY rate threshold Th and the photocurrent Irx measured as the reception quality of the block #5 received by the receiving unit 201. Since the photocurrent Irx is larger than the PHY rate threshold as illustrated in FIG. 6A, the PHY rate determining unit 206 determines the PHY rate that the communication device 100 should use for transmission next time to be "A".

Subsequently, the comparison unit 212 compares the photocurrent Irx measured as the reception quality of the block #5 received by the receiving unit 201 and the pre-threshold PreTh1 and the pre-threshold PreTh2. Here, the value of State indicating the current state of the block size is "1". In addition, since the photocurrent Irx is larger than the pre-threshold PreTh1 as illustrated in FIG. 6A, the comparison unit 212 determines that the block size that should be determined by the block size determining unit 213 is large. Since the value of State indicating the current block size state is "1", the comparison unit 212 determines that it is necessary to increase the block size, and outputs size_info indicating "2" to the block size determining unit 213 as the comparison result. At the same time, the comparison unit 212 updates the value of State indicating the block size state to "2".

Subsequently, since size_info input from the comparison unit 212 is "2", the block size determining unit 213 determines that the block size that the communication device 100 should use for transmission next time is large.

Subsequently, the feedback information generating unit 207 generates the feedback information including the PHY rate "A" and the block size "small".

Subsequently, the transmission unit 202 transmits (feeds back) the feedback information generated in the feedback information generating unit 207 to the communication device 100 after the reception of the block #5 is completed.

Next, the communication device 100 receives the feedback information in response to the block #5, and transmits the block #6 at the PHY rate "A", and the block size "large" to the communication device 200, based on the received feedback information.

As such, in this embodiment, the block size used for burst transmission is reduced when the photocurrent indicating the reception quality is included in a predetermined range including the PHY rate thresholds which require switching of the PHY rate; that is, in a range between the pre-thresholds PreTh1 and PreTh2 which includes a PHY rate threshold that requires switching of the PHY rate in between. With this, the block in a small block size is transmitted at (or around) the time when the photocurrent falls below the PHY rate, which shortens the time between the point in time when the photocurrent falls below the PHY rate threshold and the point in time when the PHY rate is switched, thereby suppressing the reduction in the transmission efficiency.

In addition, in this embodiment, even after the photocurrent exceeds the PHY rate threshold, the transmission of the blocks in small block size continues until the photocurrent exceeds the pre-threshold PreTh1. This produces an effect of allowing the PHY rate to be switched immediately even when the photocurrent decreases again while the block in the small block size is being transmitted.

This configuration is particularly effective in a communication in which the reception quality varies at random, such as infrared communication using mobile terminals to which the present invention is directed.

As described above, according to this embodiment, the block size of the blocks transmitted in a period before and after the switching of the PHY rate is reduced. This allows reducing the delay from the point in time when it becomes necessary to switch the PHY rate to the point in time when the PHY rate is actually switched, thereby suppressing the degradation in the transmission rate.

More specifically, by reducing the size of the blocks within a predetermined range including the PHY rate threshold which requires switching of the PHY rate in between, the number of opportunities for feedback transmission increases, thereby allowing the change in PHY rate to follow fluctuation in the photocurrent. In addition, when there is a constant difference between the measured photocurrent and the threshold for switching the PHY rate (when the photocurrent is outside the predetermined range), increasing the block size allows the improvement in the transmission efficiency.

Note that, although in this embodiment, the description is made using an average value of the photocurrents by measuring the data frames included in the blocks received by the receiving unit 201 as the photocurrent Irx measured as the reception quality, it is not limited to this example. For example, the minimum value or a median value of the photocurrent measured during the reception of the blocks by the receiving unit 201 may be used as the photocurrent Irx. In addition, for example, an average value of the photocurrent measured during a reception of a predetermined number of blocks immediately before the blocks being received by the receiving unit 201 may also be used as the photocurrent Irx.

Alternatively, an average value of the photocurrent measured during a reception of data frames in a predetermined number from the end of each block; in other words, data frames in a predetermined number from the start of the data frames included in the block may also be used as the photocurrent Irx measured as the reception quality. In this case, before the communication device 100 completes the transmission of the transmission of each block, feedback information is generated based on the photocurrent measured by the communication device 200, and the generated feedback information is fed back, thereby allowing more precise real-time control.

In addition, in Embodiment 1 described above, an example in which the block size control unit 210 controls the block size based on the photocurrent. However, it is not limited to this example. For example, the block size may be controlled using any information which allows estimation of the reception quality, instead of the photocurrent. Receiving power and frame error rate are examples of such information.

In addition, in Embodiment 1, the description is made using an example in which two PHY rates are used. However, it is not limited to this example. Three or more PHY rates may be used.

The following describes a case in which three PHY rates are used.

Figure 7:
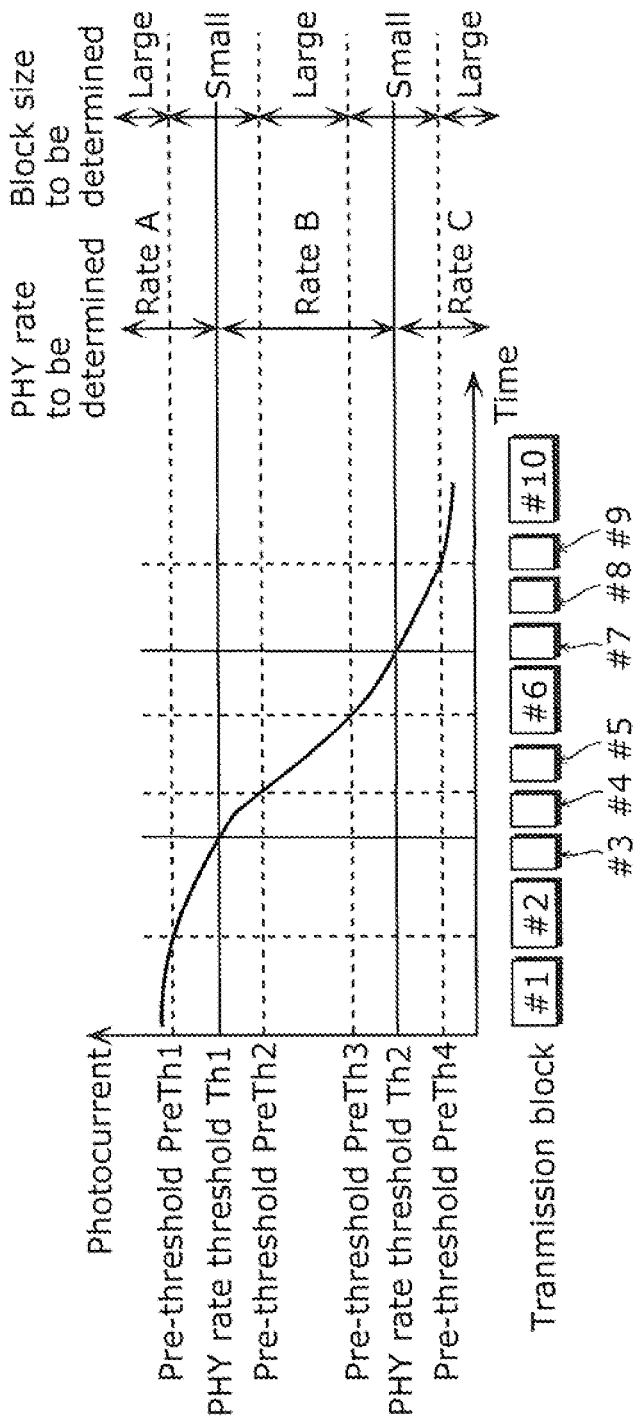
FIG. 7A illustrates an example of the control of PHY rate and block size when there are three PHY rates according to Variation 1 of Embodiment 1.
FIG. 7B illustrates an example of the control of PHY rate and block size when there are three PHY rates according to Variation 1 of Embodiment 1.

FIGS. 7A and 7B illustrate an example of PHY rate and block size control in a case where there are three PHY rates in variation 1 of Embodiment 1. FIG. 7A illustrates a change in the photocurrent and the blocks which is transmitted from the communication device 100. FIG. 7B is a chart illustrating the PHY rate and the block size used for transmitting each block by the communication device 100. In addition, in FIG. 7A, the horizontal axis indicates time, and the vertical axis indicates photocurrent, and the block to be transferred at that time and the number of the blocks are illustrated under the graph. In addition, FIGS. 7A and 7B illustrate and operation example of a process of a transmission of reception quality from a good state to a bad state, in other words, a case in which the photocurrent decreases as the time passes. The following is the premises here. The communication device 100 performs 10 burst transmissions to transmit the block #1 to #10 to the communication device 200. In addition, the communication device 100 can use three rates, that is, rate A, rate B, and rate C, and three block sizes for burst transmission, namely, large, medium, and small.

The following describes the communication device 200 which performs the operational example illustrated in FIGS. 7A and 7B in terms of the difference from the operational examples illustrated in FIGS. 5A and 6A.

The PHY rate determining unit 206 compares the photocurrent Irx measured by the photocurrent measuring unit 205 with the PHY rate threshold Th1 and the PHY rate threshold Th2. When the photocurrent Irx is larger than the PHY rate threshold Th1, the PHY rate determining unit 206 determines the PHY rate that the communication device 100 should use for the next transmission to be "A". When the photocurrent Irx is smaller than the PHY rate threshold Th1 and larger than the PHY rate threshold Th2, the PHY rate determining unit 206 determines the PHY rate that the communication device 100 should use for the next transmission to be "B". In addition, when the photocurrent Irx is smaller than the PHY rate threshold Th2, the PHY rate determining unit 206 determines the PHY rate that the communication device 100 should use for the next transmission to be "C".

The photocurrent threshold determining unit 211 determines four photocurrent pre-thresholds, namely, PreTh1, PreTh2, PreTh3, and PreTh4.

The block size control unit 210 determines one of the block sizes, that is, large, medium, or small, based on the reception quality measured by the photocurrent measuring unit 205 and the photocurrent pre-thresholds PreTh1, PreTh2, PreTh3, and PreTh4.

The comparison unit 212 determines whether or not the photocurrent Irx measured by the photocurrent measuring unit 205 satisfies one of the first condition and the second condition. The first condition is that the photocurrent Irx is smaller than the pre-threshold PreTh1 and larger than PreTh2, and the second condition is that the photocurrent Irx is smaller than the pre-threshold PreTh3 and larger than PreTh4. The process by the comparison unit 212 proceeds to S101 when one of the first and second conditions is satisfied, and proceeds to S105 when none of the first and second conditions is satisfied.

Note that, the specific operations of the communication device 100 and the communication device 200 in the operational example illustrated in FIGS. 7A and 7B are similar to the description with reference to FIG. 5A and FIG. 6A except the above-mentioned description; that is, the different determining condition in the PHY rate determining unit 206 and the comparison unit 212. Thus, detailed description is omitted.

In addition, in this variation, a case where there are two pre-thresholds are set before and after the PHY rate threshold. However, it is not limited to this example.

The following describes a case where there are four pre-thresholds are set before and after one PHY rate threshold.

Figure 8:
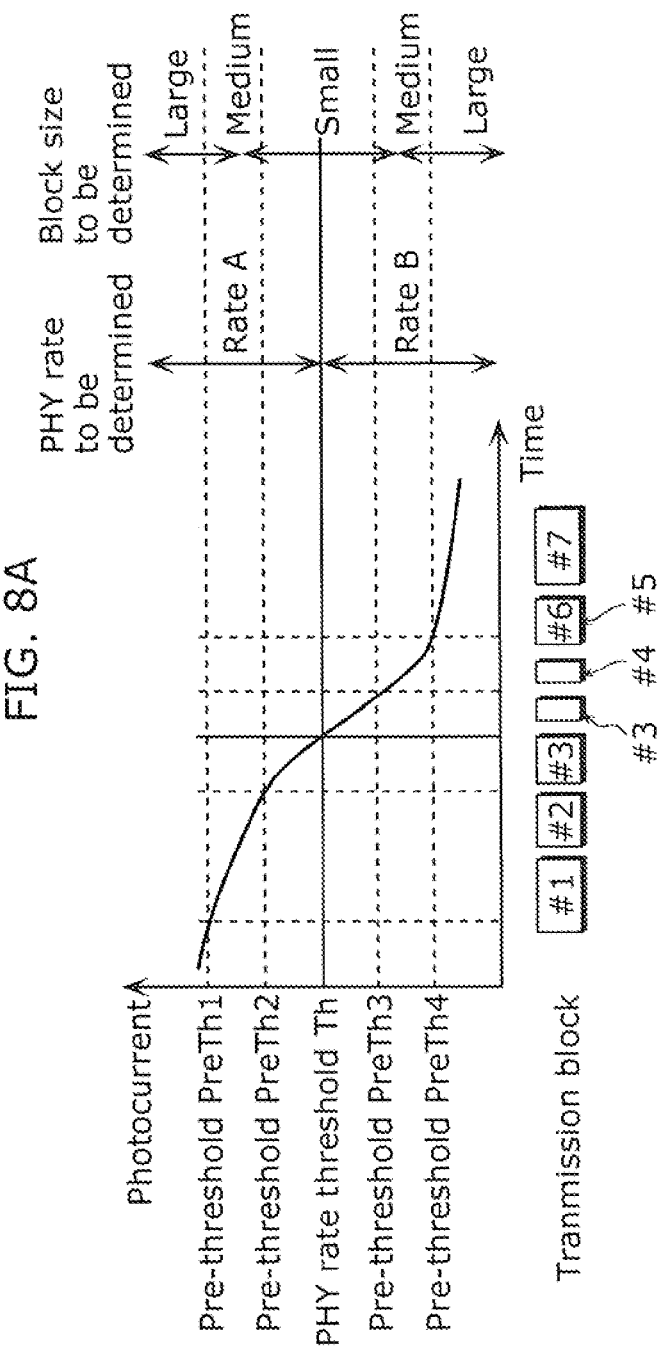
FIG. 8A is a diagram illustrating an example of the control of the PHY rate and block size when there are 4 pre-thresholds set before and after one PHY rate threshold according to Variation 2 of Embodiment 1.
FIG. 8B is a diagram illustrating an example of the control of the PHY rate and block size when there are 4 pre-thresholds set before and after one PHY rate threshold according to Variation 2 of Embodiment 1.

FIGS. 8A and 8B illustrate an example of PHY rate and block size control when there are four pre-thresholds set before and after one PHY rate threshold, according to variation 2 of Embodiment 1. FIG. 8A illustrates a change in the photocurrent and the blocks which are transmitted from the communication device 100. FIG. 8B is a chart illustrating the PHY rate and the block size used for transmitting each block by the communication device 100. In addition, in FIG. 8A, the horizontal axis indicates time, the vertical axis indicates photocurrent, and the block to be transferred at that time and the number of the blocks are illustrated under the graph. In addition, FIGS. 8A and 8B illustrate an operation example of a process of a transmission of reception quality from a good state to a bad state, in other words, a case in which the photocurrent decreases as the time passes. The following is the premises here. The communication device 100 performs 7 burst transmissions to transmit the blocks #1 to #7 to the communication device 200. In addition, the communication device 100 can use two rates, that is, rate A and rate B, and three block sizes for burst transmission, namely, large, medium, and small.

The following describes the communication device 200 which performs the operational example illustrated in FIGS. 8A and 8B in terms of the difference from the operational examples illustrated in FIGS. 5A and 6A.

The photocurrent threshold determining unit 211 determines four photocurrent pre-thresholds, namely, PreTh1, PreTh2, PreTh3, and PreTh4.

The block size control unit 210 determines one of the block sizes, that is, large, medium, or small, based on the reception quality measured by the photocurrent measuring unit 205 and the photocurrent pre-thresholds PreTh1, PreTh2, PreTh3, and PreTh4.

When the photocurrent Irx measured by the photocurrent measuring unit 205 is smaller than the pre-threshold PreTh1 or the pre-threshold PreTh4, the comparison unit 212 sets the value of State indicating the state of the block size as "3". When the photocurrent Irx measured by the photocurrent measuring unit 205 is smaller than the pre-threshold PreTh1 and equal to or higher than the pre-threshold TreTh2, or when the photocurrent Irx is smaller than the pre-threshold PreTh3 and equal to or higher than the pre-threshold PreTh4, the value of State indicating the state of the block size is set to be "2". When the photocurrent Irx measured by the photocurrent measuring unit 205 is smaller than the pre-threshold PreTh2 and equal to or higher than the pre-threshold PreTh3, the comparison unit 212 sets the value of State indicating the state of the block size as "1".

In addition, the comparison unit 212 compares the value of State indicating the state of the block size generated based on the photocurrent Irx of the block that has been received before and the value of State indicating the state of the block size generated based to on the photocurrent Irx of the newly received block, and generates the control information size_info.

The block size determining unit 213 determines whether or not the block size changes according to the value of the size_info, and determines the block size to be notified of the feedback information generating unit 207. Here, the block size determining unit 213 determines the block size to be largest when the comparison unit 212 sets the value of State indicating the state of the block size as "3", and smallest when the comparison unit 212 sets the value of State indicating the state of the block size as "1".

Note that, in FIGS. 8A and 8B, the block size when the value of State indicating the state of block size is set as "3" is represented as "large", the block size when the value of State indicating the state of block size is set as "2" is represented as "medium", and the block size when the value of State indicating the state of block size is set as "1" is represented as "small". In addition, the specific operation of the communication device 100 and the communication device 200 in the operational example illustrated in FIGS. 8A and 8B is similar to the description made with reference to FIGS. 5A and 6A except the difference in the determining condition in the PHY rate determining unit 206 and the comparison unit 212, and thus the description for them is omitted.

As described above, increasing the number of pre-thresholds set within a range centered by the PHY rate threshold for switching the PHY rate allows the block size of the blocks transmitted during a period before and after the switching in the PHY rate threshold to be gradually reduced. This avoids the block size to be drastically small in a period before and after the switching of the PHY rate thresholds, suppressing the degradation in the transmission efficiency due to the smaller block size.

Note that, in an operational example illustrated in FIGS. 8A and 8B, the description is made using a configuration in which the number of pre-thresholds is set within a predetermined range centered by one PHY rate threshold. However, it is not limited to this example. For example, the block size control unit 210 may calculate the difference between the PHY rate threshold and the photocurrent Irx measured as the reception quality of each block received by the receiving unit 201, and may determine the block size according to the calculated difference. More specifically, the larger the difference between the photocurrent Irx and the PHY rate threshold, the block size control unit 210 may determine a larger block size as the block size that the communication device 100 should use for transmission next time. This configuration allows flexible control of the block size according to the difference in the photocurrent Irx and the PHY rate threshold, allowing efficient suppression of degradation in the transmission efficiency due to the smaller block size.

Embodiment 2

The following describes a communication device according to Embodiment 2 of the present invention.

Figure 9:
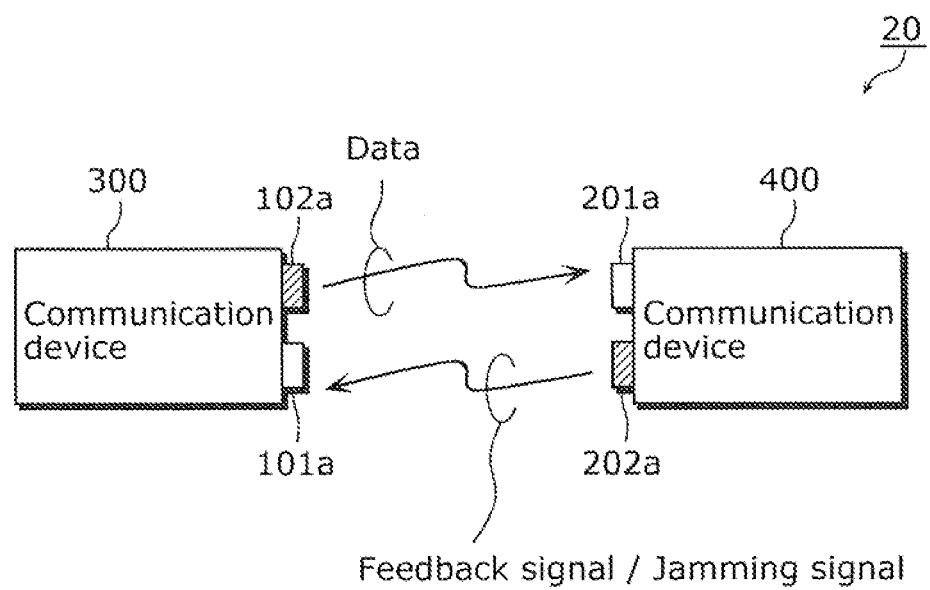
FIG. 9 illustrates an exemplary configuration of the communication system according to Embodiment 2.

FIG. 9 illustrates an exemplary configuration of the communication system according to Embodiment 2. Note that, the same reference numerals are assigned to elements identical to those in FIG. 1, and the detailed description for them is omitted.

The communication system 20 illustrated in FIG. 9 includes a communication device 300 and a communication device 400. The communication device 300 is an infrared communication device which transmits data via infrared light, and the communication device 400 is an infrared communication device which receives the data via infrared light, and transmits feedback information and jamming signals. Here, the jamming signals refer to signals (instruction signals) for stopping the transmission of data frames by the communication device 300.

Figure 10:
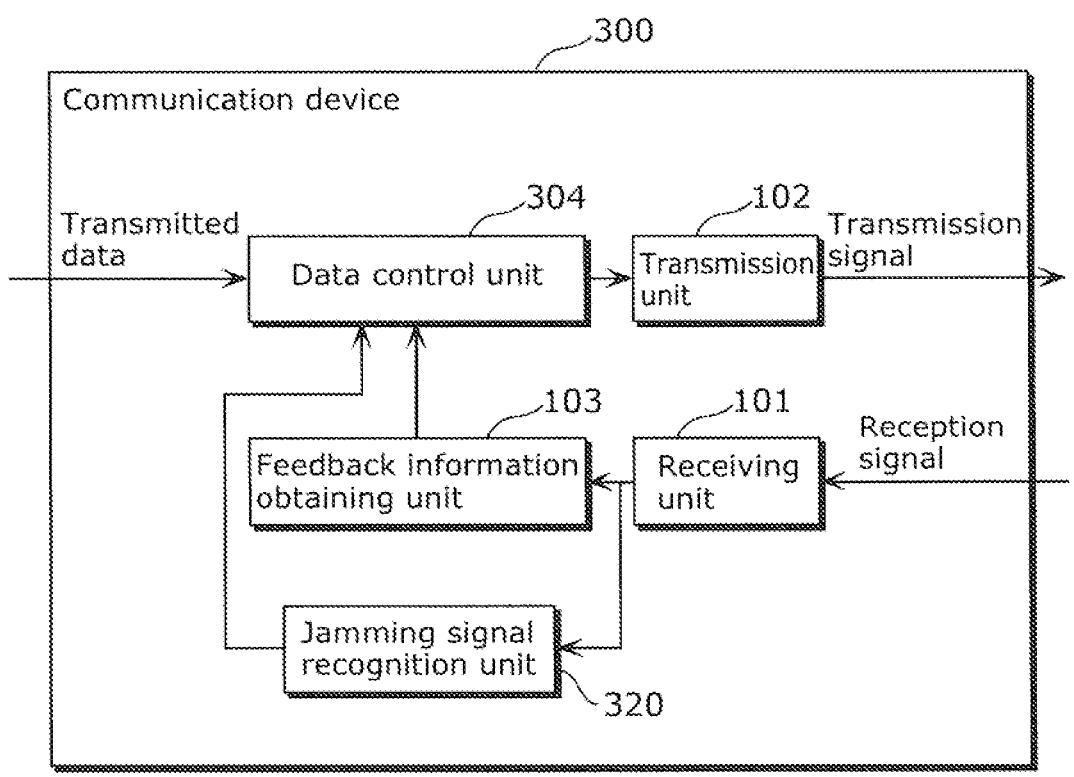
FIG. 10 is a block diagram illustrating the configuration of the communication device 300 according to Embodiment 2.

FIG. 10 is a block diagram illustrating the configuration of the communication device 300 according to Embodiment 2. Note that, the same reference numerals are assigned to the components identical to those in the communication device 100 in FIG. 2 and the description for these components are omitted.

The communication device 300 illustrated in FIG. 10 includes the receiving unit 101, the transmission unit 102, the feedback information obtaining unit 103, a data control unit 304, and a jamming signal recognition unit 320. The communication device 300 differs from the communication device 100 in FIG. 2 in having different functions for the data control unit 304, and having another component; i.e., the jamming signal recognition unit 320.

When the data is being transmitted by the transmission unit 102, the jamming signal recognition unit 320 detects whether or not the receiving unit 101 receives a jamming signal from the communication device 200. When the reception of the jamming signal is detected, the jamming signal recognition unit 320 outputs, to the data control unit 304, an instruction for stopping the data transmission.

The data control unit 304 instructs the transmission unit 102 to transmit data, based on the feedback information obtained by the feedback information obtaining unit 103 such as the PHY rate. In addition, when the instruction for stopping the data transmission input from the jamming signal recognition unit 320 is detected by the data control unit 304 during a transmission of data frames belonging to a block for each block by the transmission unit 102, the data control unit 304 instructs the transmission unit 102 to stop transmitting data frames.

The communication device 300 is configured as described above.

Figure 11:
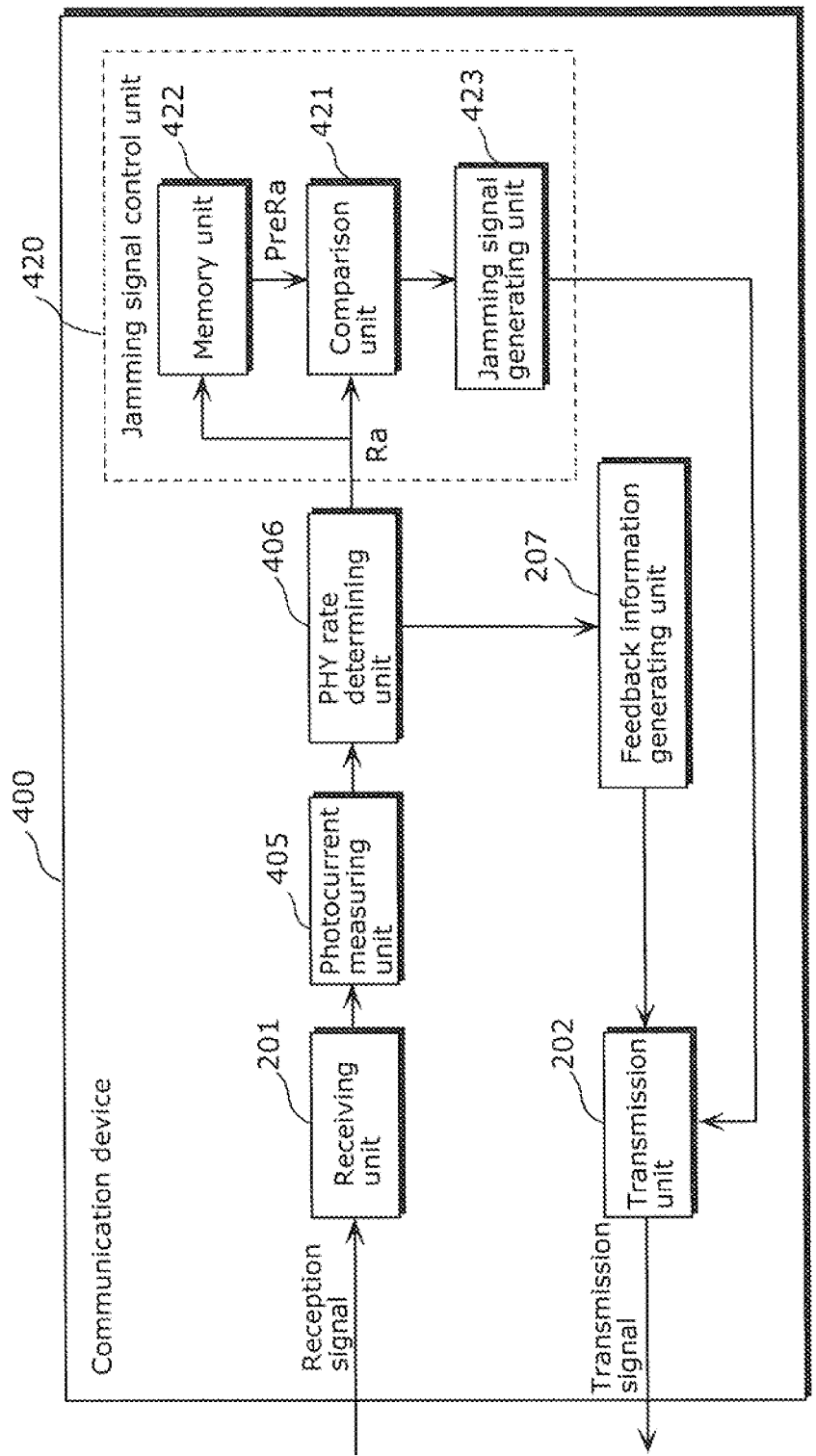
FIG. 11 is a block diagram illustrating the configuration of the communication device 400 according to Embodiment 2.

FIG. 11 is a block diagram illustrating the configuration of the communication device 400 according to Embodiment 2. Note that, the same reference numerals are assigned to the components identical to those in the communication device 200 in FIG. 3 and the description for these components are omitted.

The communication device 400 illustrated in FIG. 11 includes the receiving unit 201, the transmission unit 202, a photocurrent measuring unit 405, the PHY rate determining unit 406, the feedback information generating unit 207, and the jamming signal control unit 420. The communication device 400 differs from the communication device 200 in FIG. 3 in that the photocurrent measuring unit 405 and the PHY rate determining unit 406 have different functions and configurations, and includes the jamming signal control unit 420 instead of the block size control unit 210.

The photocurrent measuring unit 405 measures the photocurrent of the signal received by the receiving unit 201, and calculates an average value Irx of the photocurrent for each frame within one block.

The PHY rate determining unit 406 calculates, for each data frame, the PHY rate that the communication device 300 should use for transmission, based on the reception quality for each data frame belonging to the block measured by the photocurrent measuring unit 405. More specifically, the PHY rate determining unit 406 calculates a most suitable PHY rate (Ra) according to the photocurrent Irx for each frame measured by the photocurrent measuring unit 405. The PHY rate determining unit 406 notifies the comparison unit 421 of the calculated most suitable PHY rate. In addition, in the same manner as the PHY rate determining unit 206, the PHY rate determining unit 406 determines the most suitable PHY rate (PreRa) for each block.

The jamming signal control unit 420 causes the transmission unit 202 to transmit a jamming signal for stopping a transmission of the block being transmitted by the communication device 300, when the PHY rate used for transmitting the block being received by the receiving unit 201 and the PHY rate that the communication device 300 should use when transmitting the data frames belonging to the block calculated by the PHY rate determining unit 406 are different. More specifically, the jamming signal control unit 420 includes a comparison unit 421, a memory unit 422, and a jamming signal generating unit 423. The jamming signal control unit 420 determines whether or not the PHY rate used for the signals that are being received is suitable for the current reception quality, and when it is determined that the PHY rate of the signals being received by the receiving unit 201 is not suitable, the jamming signal control unit 420 generates a jamming signal which is a signal for stopping the communication device 300 transmitting the data frames.

The following describes detailed configuration of the jamming signal control unit 420 and its operations.

The memory unit 422 stores the PHY rate (PreR) for each block determined by the PHY rate determining unit 406. The comparison unit 421 reads a PHY rate one block before the block being received by the receiving unit 201 (PreRa) from the memory unit 422.

The comparison unit 421 compares the PHY rate that should be used by the communication device 300 when transmitting the data frames notified by each data frame from the PHY rate determining unit 206 (Ra) and the PHY rate read from the memory unit 422 (PreRa). When PreRa and Ra are different, the comparison unit 421 determines that the PHY rate of the signal that is currently being received by the receiving unit 201 is not suitable, and notifies this of the jamming signal generating unit 423.

When the jamming signal generating unit 423 is notified a determination result from the comparison unit 421 that the PHY rate of the signals that are currently being received by the receiving unit 201 is not suitable, the jamming signal generating unit 423 generates the jamming signals. The jamming signal generating unit 423 transmits the generated jamming signal through the transmission unit 202 even during the burst transmission of the data frames from the communication device 300.

The jamming signal control unit 420 is configured as described above.

The following describes a process performed each time the PHY rate determining unit 206 and the jamming signal control unit 420 receive the data frame.

Figure 12:
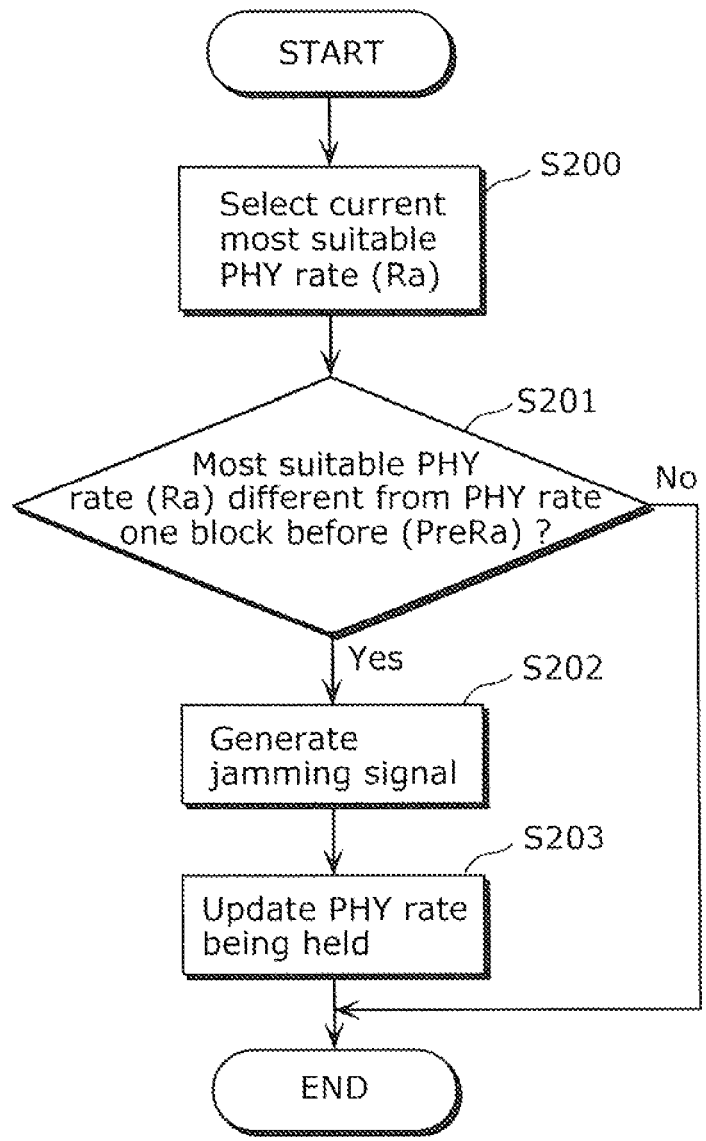
FIG. 12 is a flowchart for describing the operation of the communication device 400 according to Embodiment 2.

FIG. 12 is a flowchart for describing the operation of the communication device 400 according to Embodiment 2.

First, the PHY rate determining unit 406 calculates a suitable PHY rate (Ra), based on the photocurrent Irx which is the reception quality for each data frame belonging to the block measured by the photocurrent measuring unit 405 (S200). Here, the suitable PHY rate (Ra) refers to a PHY rate (Ra) that the communication device 300 should use when transmitting the data frame.

Next, the comparison unit 421 determines whether or not the PHY rate (Ra) calculated in S200 is identical to the PHY rate one block before the block being received by the receiving unit, which is determined based on the reception quality of the previous block (PreRa) (S201).

In S201, when it is determined that Ra and PreRa are different values (Yes in S201), the comparison unit 421 notifies of the jamming signal generating unit 423 of a determination result that the PHY rate of the signals currently being received by the receiving unit 201 is not suitable. Subsequently, the jamming signal generating unit 423 generates the jamming signal (S202).

Next, in S203, the PHY rate determining unit 406 updates the PHY rate held by the memory unit 422. Here, the PHY rate determining unit 406 updates the value of PreRa held by the memory unit 422 to a value indicated by Ra.

On the other hand, when it is determined that Ra and PreRa are identical in S201, the comparison unit 421 notifies the jamming signal generating unit 423 of the determination result that the PHY rate of the signals that are being received by the receiving unit 201 is suitable. Subsequently, the processing by the PHY rate determining unit 406 and the jamming signal control unit 420 end.

The communication device 400 operates as described above.

Figure 13:
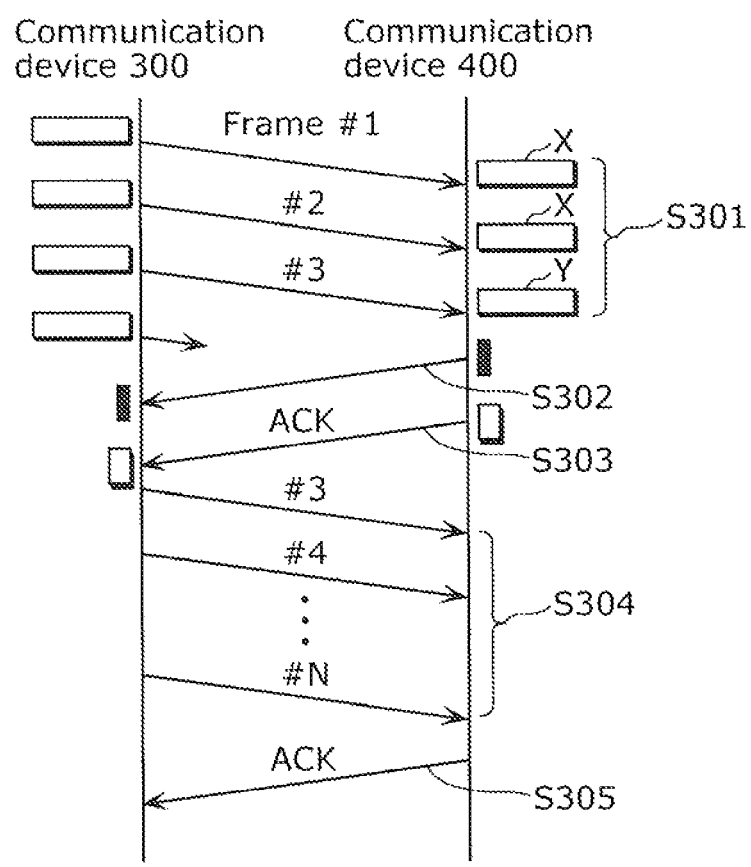
FIG. 13 is a diagram illustrating an example of the transmission and reception sequence when transmitting jamming signals according to Embodiment 2.

FIG. 13 illustrates an example of the transmission and reception sequence when transmitting the jamming signal according to Embodiment 2. More specifically, FIG. 13 illustrates an example of the signals transmitted and received between the communication device 400 and the communication device 300 when the communication device 400 stops the burst transmission of data frames from the communication device 300 using the jamming signal.

First, the communication device 300 starts burst transmission of a block, that is, the data frame #1 to the data frame #N belonging to the block to the communication device 400.

Subsequently, the communication device 300 detects, for example, that the data frame #3 is transmitted at an unsuitable PHY rate different from the PHY rate suitable for the current reception quality during the reception of the data frame #3 (S301). Here, X illustrated in FIG. 13 is the reception quality of the data frame #1 and the data frame #2, and indicates that the reception quality is identical. Y is the reception quality of the data frame #3, and indicates that the reception quality is different from X. Subsequently, the communication device 400 transmits the jamming signal to the communication device 300 for stopping the transmission of the block from the communication device 300 (S302).

Next, when the reception of the jamming signal is recognized during the burst transmission of a data frame belonging to the block (for example, the data frame #4), the communication device 300 immediately stops transmitting the data frame. The communication device 300 subsequently switches the mode from the transmission mode to the reception mode.

Next, the communication device 400 notifies the communication device 300 of the feedback information including the PHY rate calculated during the reception of the data frame #3, together with Ack (ack data frame) indicating that the data frame #1 and the data frame #2 are received (S304).

Subsequently, the communication device 300 resends the data frame #3, and resumes transmission of the data frame #4 to the data frame #N, using the PHY rate included in the notified feedback information.

Next, the communication device 400 transmits, to the communication device 300, ACK (ACK data frame) indicating that data frames up to the data frame #N belonging to the block is received (S305).

The jamming signal is transmitted as described above.

Note that, although the data frame #3 in which the reception quality changed is resent, it is not limited to this example. When the data frame #3 is received without any missing data, the communication device 300 may be notified of feedback information including the PHY rate calculated during the reception of the data frame #3, together with ACK up to the data frame #3.

In addition, when the burst transmission by the communication device 300 resumes from the frame #4 after the reception of the jamming signal and stopping of the burst transmission, the communication device 400 may notify the communication device 300 of ACK for the frames #1 to #3 together with the feedback information after the communication device 400 stops the burst transmission from the communication device 300 by transmitting the jamming signal, considering a case where any of the frames #1 to #3 is not accurately received In this case, the communication device 300 may transmit the data frame that was not correctly received among the frames #1 to #3, and resume transmitting the frame #4 to #N afterwards.

As described above, according to this embodiment, the transmission of the data frames from the communication device is immediately stopped when the data is transmitted at an unsuitable PHY rate, allowing the transmission to resume after switching to a suitable PHY rate. This achieves an effect of suppressing an increase of transmission error caused by continuing transmission at a PHY rate higher than the suitable PHY rate and reduction in the transmission efficiency caused by continuing the transmission at a PHY rate lower than the suitable PHY rate.

Furthermore, in the communication device having a transmission unit and a receiving unit individually and that utilizes optical signals such as infrared signals used in infrared communication can detect that the jamming signals are received at the receiving unit even when the data frames are being transmitted. Thus, there is another advantage that the burst transmission is stopped using the jamming signal without separately providing a communication unit for notifying the jamming signals as described above.

Note that, the jamming signal in this embodiment may be sufficient as long as the communication device 300 can determine whether or not there is a jamming signal. For this reason, the frame format of the jamming signal may be any format.

Furthermore, in the above description, the jamming signal is generated based on the comparison result between the PHY rate calculated for each data frame (Ra) and the PHY rate suitable for each block (PreRa). However, it is not limited to this example. The PHY rate calculated for a data frame immediately before the data frame whose PHY rate (Ra) is calculated for each data frame may also be determined as PreRa.

Furthermore, the description is made in Embodiment 2 using an example in which the control of block size using the feedback information that was performed in Embodiment 1 is not performed. However, the control using jamming signals and the control in block size using the feedback information may be used in combination. The following describes the configuration with reference to the drawings.

Figure 14:
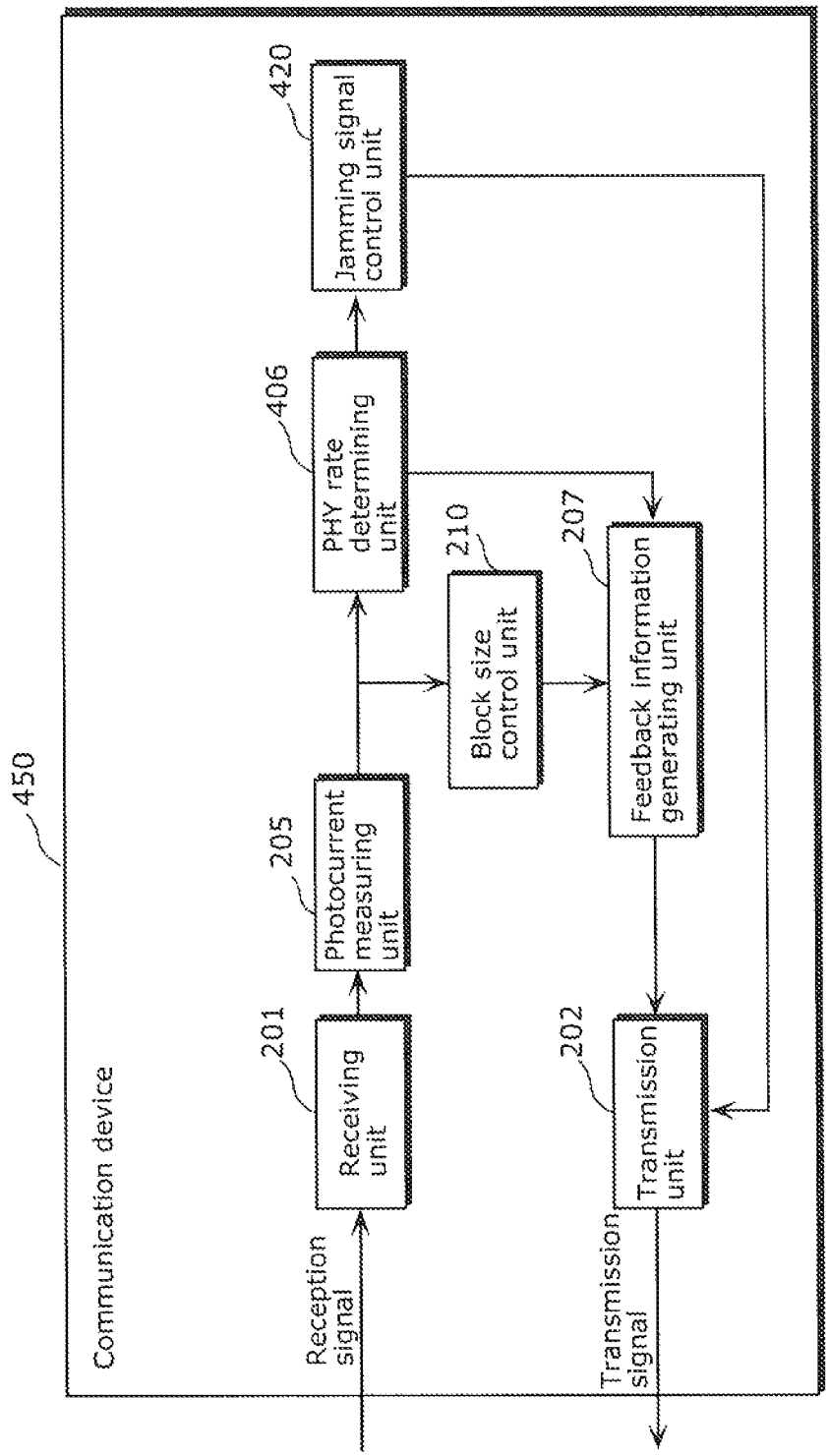
FIG. 14 is a block diagram illustrating an example when Embodiment 2 and Embodiment 1 are combined.
Figure 15A:
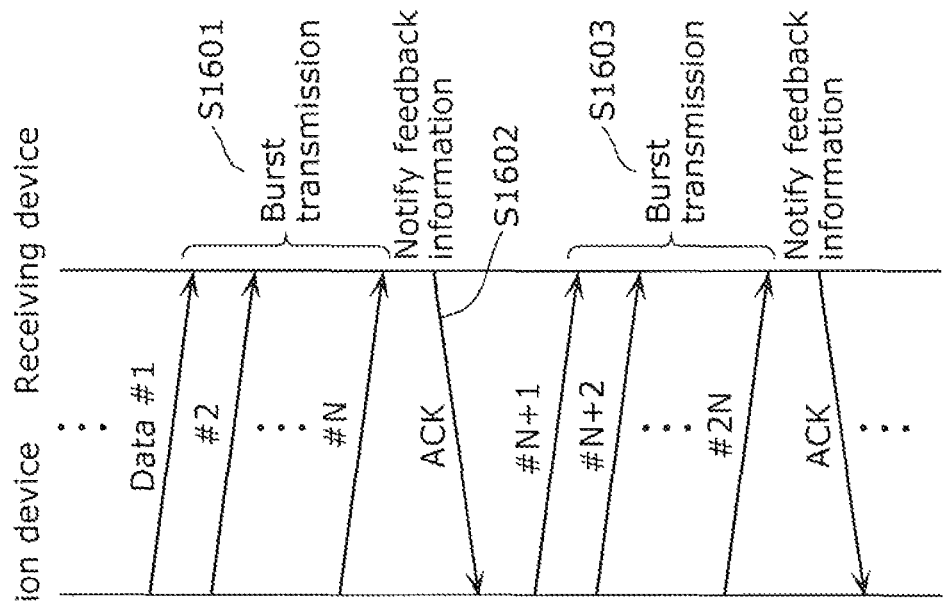
FIG. 15A is a sequence diagram illustrating the procedure of adaptive PHY rate control when burst transmission is not performed.
Figure 15B:
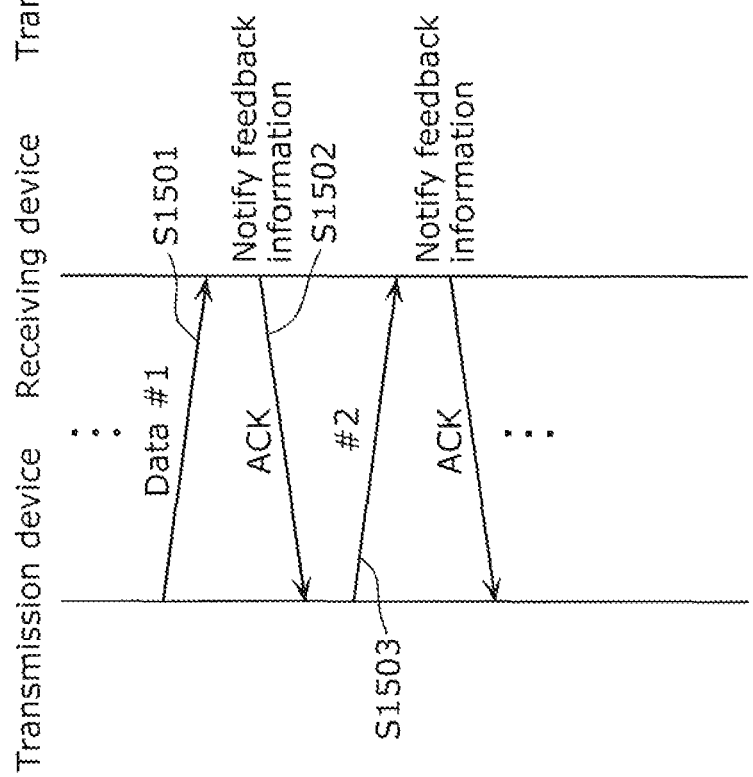
FIG. 15B is a sequence diagram illustrating the procedure of adaptive PHY rate control when burst transmission is performed.
Figure 16A:
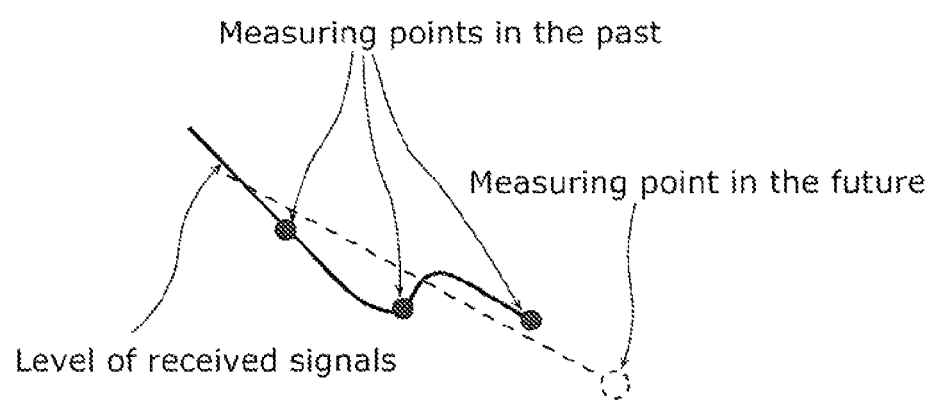
FIG. 16A schematically illustrates the method disclosed in Patent Literature 1.
Figure 16B:
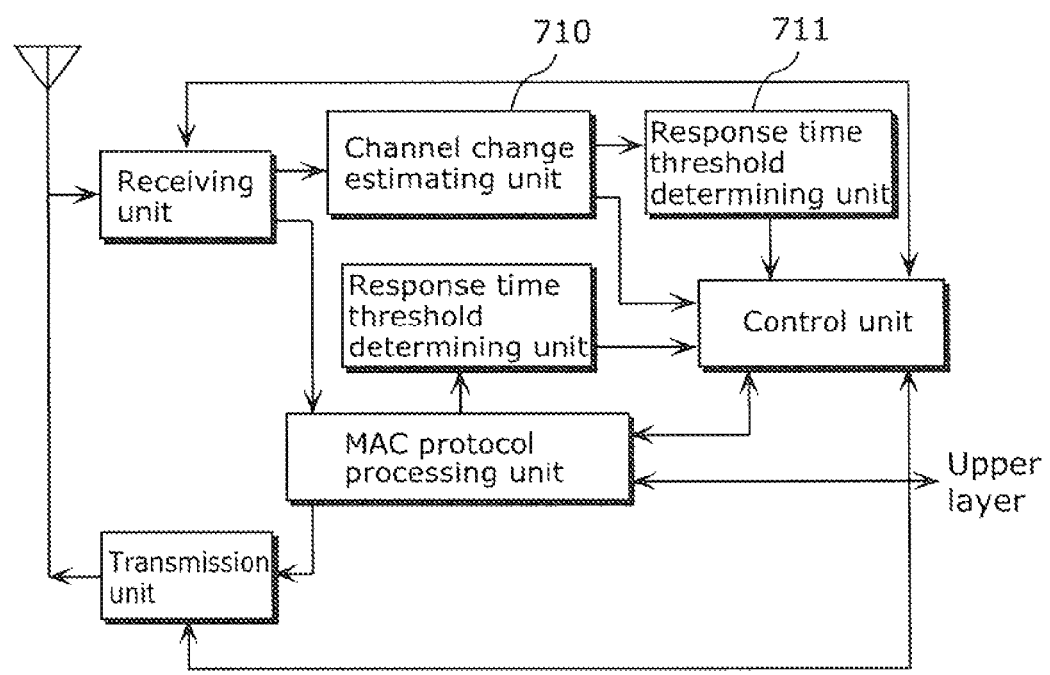
FIG. 16B illustrates the configuration of the transmission/receiving device disclosed in Patent Literature 2.
Figure 17:
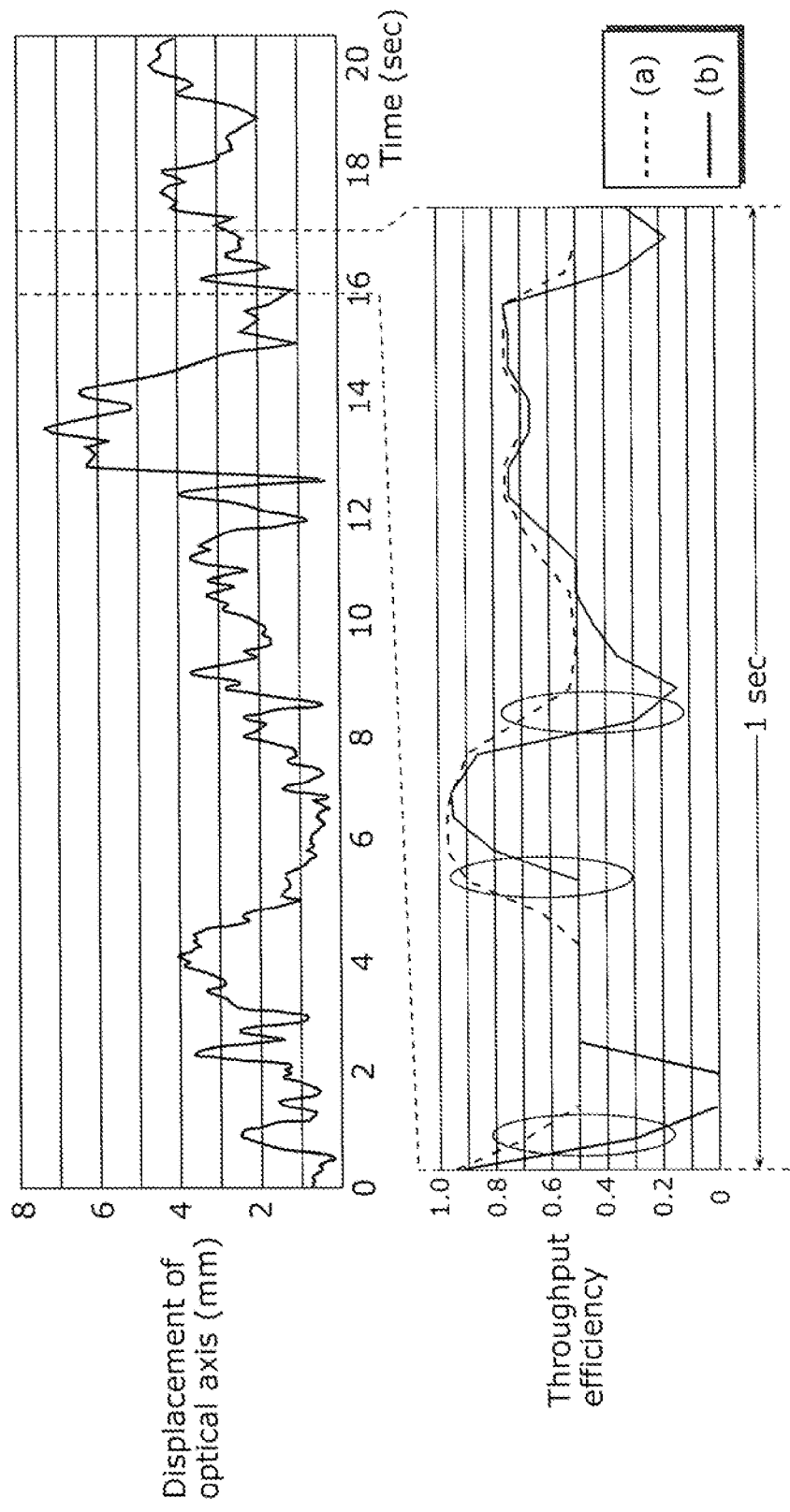
FIG. 17 illustrates that the reception quality of infrared communication by the communication device fluctuates in an environment with hand movements.

FIG. 14 is a block diagram illustrating the configuration of the communication device 450 in a variation of Embodiment 2. FIG. 14 illustrates an exemplary configuration of the communication device 450 combining the control using the jamming signal and the control in block size using the feedback information.

The communication device 450 illustrated in FIG. 14 includes the receiving unit 201, the transmission unit 202, the photocurrent measuring unit 205, the PHY rate determining unit 406, the feedback information generating unit 207, and the jamming signal control unit 420. Note that the same reference numerals are assigned to the components identical to those in the communication device 200 in FIG. 3 and the communication device 400 in FIG. 11, and the description for these components is omitted.

In the communication device 450 illustrated in FIG. 14, when the photocurrent fluctuates and the block size that is finely controlled by the control of the block size using the feedback information, and the reduction in transmission efficiency causes problems due to the transmission of data frames at an inappropriate PHY rate, it is possible to suppress the reduction in the transmission efficiency by the effect of the second embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the configuration of the embodiments may be typically implemented as large scale integration (LSI) which is an integrated circuit. They may be individually made into chips, or may also be made into a chip including the entire or partial configuration. The integrated circuits may be referred to as IC, system LSI, super LSI, or ultra LSI, depending on the degree of integration.

Furthermore, the integrated circuit may not only be limited to LSI but may also be implemented as a dedicated circuit or a general-purpose processor. In addition, field programmable gate array (FPGA) or a reconfigurable processor that allows the connection and setting of the circuit cells inside the LSI may also be used.

When a new technology for integrating circuits that would replace the conventional semiconductor technology along the progress in the semiconductor technology or other derived technology, the technology are naturally used for integrating the functional blocks. For example, application of bio-technology is one of the possibilities.

INDUSTRIAL APPLICABILITY

The present invention can be used for the communication device that allows high-speed transmission and the communication method, and particularly for the communication device that allows high-speed transmission but with high possibility of random change in communication quality such as infrared communication by mobile terminals and visible light communication using visible light source such as illumination light source and a communication method thereof.

What is claimed is:
1. A communication device which receives data frames transmitted by another communication device, said communication device comprising:
  a receiving unit configured to receive data frames for each block including data frames continuously transmitted by the other communication device;
  a measuring unit configured to measure a reception quality of the block received by said receiving unit, the recep- tion quality indicating a level of a received signal of the block received by said receiving unit;

a physical layer (PHY) rate determining unit configured to determine, based on the reception quality of the block measured by said measuring unit, a PHY rate that is used by the other communication device for transmitting data frames included in a next block which is immediately after the block;

a block size control unit configured to determine, based on the reception quality of the block measured by said measuring unit, a block size indicating the number of data frames to be included in the next block by the other communication device; and a transmission unit configured to transmit feedback information including the PHY rate determined by said PHY rate determining unit and the block size determined by said block size control unit to the other communication device, wherein said block size control unit is configured to determine the block size to be a value smaller than a maximum value of a block size that can be transmitted by the other communication device, when a value indicating the reception quality of the block is within a predetermined range including a PHY rate threshold which is a threshold for changing a PHY rate.

2. The communication device according to claim 1, wherein, when the value indicating the reception quality of the block is within the predetermined range, said block size control unit is configured to determine the block size to be a block size smaller than a block size determined when the value indicating the reception quality is out of the predetermined range.

3. The communication device according to claim 1, wherein the predetermined range is set to a range corresponding to a period longer than a period from when the other communication device transmits the next block to said communication device to when the other communication device receives feedback information for the next block, the other communication device using a block size determined by said block size control unit when the value indicating the reception quality of the block is out of the predetermined range.

4. The communication device according to claim 1, wherein the other communication device transmits data frames included in a block as an optical signal, and in said communication device, said measuring unit is configured to measure the reception quality of the block by measuring a photocurrent in each of the data frames included in the block received by said receiving unit and by calculating an average value of the measured photocurrents of the data frames.

5. The communication device according to claim 4, wherein the optical signal is an infrared signal used for infrared communication.

6. The communication device according to claim 1, wherein the PHY rate includes multi-value modulation, a coding rate, and a bandwidth.

7. The communication device according to claim 1, wherein said PHY rate determining unit is configured to calculate, based on a reception quality of each of the data frames belonging to the block measured by said measuring unit, a PHY rate that should be used for transmission by the other communication device for each of the data frames, and said communication device further comprises a jamming signal control unit configured to cause said transmission unit to transmit a jamming signal for stopping a transmission of the block being transmitted by the other communication device, when the PHY rate used for transmitting the block being received by said receiving unit and the PHY rate that the other communication device should use when transmitting the data frames belonging to the block calculated by said PHY rate determining unit are different.

8. A communication device which transmits, to another communication device, data frames for each block including continuous data frames, said communication device comprising:

a receiving unit configured to receive, from the other communication device, feedback information including a PHY rate that is used by said communication device for transmitting each block and a block size indicating the number of data frames included in the block;

a data control unit configured to generate the block according to the block size included in the feedback information received by said receiving unit; and a transmission unit configured to modulate the block generated by said data control unit at the PHY rate included in the feedback information and to transmit the modulated block to the other communication device, wherein the feedback information is determined based on a reception quality of the block received by the other communication device, the reception quality indicating a level of a received signal of the block received by the other communication device, and the block size is determined to be a value smaller than a maximum value of a block size that can be transmitted by the communication device, when a value indicating the reception quality of the block is within a predetermined range including a PHY rate threshold which is a threshold for changing a PHY rate.

9. A communication method for a communication device which receives data frames transmitted by another communication device, said communication method comprising:

receiving data frames for each block including data frames continuously transmitted by the other communication device;

measuring a reception quality of the block received in said receiving, the reception quality indicating a level of a received signal of the block received in said receiving;

determining, based on the reception quality of the block measured in said measuring, a PHY rate that is used by the other communication device for transmitting data frames included in a next block which is immediately after the block;

determining, based on the reception quality of the block measured by said measuring, a block size indicating the number of data frames to be included in the next block by the other communication device; and transmitting feedback information including the PHY rate determined by said determining of PHY rate and the block size determined by said determining of block size to the other communication device, wherein said determining of a block size further includes determining the block size to be a value smaller than a maximum value of a block size that can be transmitted by the other communication device, when a value indicating the reception quality of the block is within a predetermined range including a PHY rate threshold which is a threshold for changing a PHY rate.

10. A communication method for a communication device which transmits, to another communication device, data frames for each block including continuous data frames, said communication method comprising:

receiving, from the other communication device, feedback information including a PHY rate that is used by said communication device for transmitting each block and a block size indicating the number of data frames included in the block;
generating the block according to the block size included in the feedback information received in said receiving; and
modulating the block generated by said generating at the PHY rate included in the feedback information and transmitting the modulated block to the other communication device,
  wherein the feedback information is determined based on a reception quality of the block received by the other communication device, the reception quality indicating a level of a received signal of the block received by the other communication device, and
  the block size is determined to be a value smaller than a maximum value of a block size that can be transmitted by the communication device, when a value indicating the reception quality of the block is within a predetermined range including a PHY rate threshold which is a threshold for changing a PHY rate.

* * * * *